(12) United States Patent
Choi et al.

(10) Patent No.: US 12,501,384 B2
(45) Date of Patent: Dec. 16, 2025

(54) COMMUNICATION METHOD AND APPARATUS FOR REDUCED-CAPABILITY UE IN WIRELESS COMMUNICATION SYSTEM

(71) Applicant: Samsung Electronics Co., Ltd., Gyeonggi-do (KR)

(72) Inventors: Seunghoon Choi, Gyeonggi-do (KR); Youngbum Kim, Gyeonggi-do (KR); Sungjin Park, Gyeonggi-do (KR); Junyung Yi, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 324 days.

(21) Appl. No.: 18/095,274

(22) Filed: Jan. 10, 2023

(65) Prior Publication Data
US 2023/0224837 A1 Jul. 13, 2023

(30) Foreign Application Priority Data
Jan. 11, 2022 (KR) ........................ 10-2022-0004223

(51) Int. Cl.
*H04W 56/00* (2009.01)
*H04L 1/08* (2006.01)
*H04W 72/1268* (2023.01)

(52) U.S. Cl.
CPC .......... *H04W 56/0015* (2013.01); *H04L 1/08* (2013.01); *H04W 72/1268* (2013.01)

(58) Field of Classification Search
None
See application file for complete search history.

(56) References Cited

U.S. PATENT DOCUMENTS 12,156,230 B2 * 11/2024 Takahashi ............. H04W 72/23
2019/0349180 A1 11/2019 Lu et al.
(Continued)

FOREIGN PATENT DOCUMENTS

KR 10-2022-0022831 2/2022

OTHER PUBLICATIONS

Zte, Sanechips, "HD-FDD for Reduced Capability NR Devices", R1-2111067, 3GPP TSG RAN WG1 #107-e, Nov. 11-19, 2021, 13 pages.
(Continued)

*Primary Examiner* — Anh Vu H Ly
(74) *Attorney, Agent, or Firm* — The Farrell Law Firm, P.C.

(57) ABSTRACT

The disclosure relates to a 5G or 6G communication system for supporting a higher data transmission rate. The disclosure relates to an operation of a RedCap UE and a base station in a wireless communication system. More specifically, the disclosure relates to an operation method of a RedCap UE considering a switching gap and an apparatus for performing the same. A method performed by a terminal in a communication system includes receiving, from a base station, information indicating positions of SS/PBCH blocks, identifying the positions of the SS/PBCH blocks based on the information, receiving, from the base station, configuration information on PUSCH repetition, identifying available resources for the PUSCH repetition by determining resources overlapped with the positions of the SS/PBCH blocks and switching intervals for the SS/PBCH blocks as unavailable resources for the PUSCH repetition, and repeatedly transmitting, to the base station, UL data on a PUSCH based on the available resources.

20 Claims, 19 Drawing Sheets

(56) References Cited

U.S. PATENT DOCUMENTS

| | | | |
|---|---|---|---|
| 2020/0396744 | A1 | 12/2020 | Xiong et al. |
| 2022/0061098 | A1 | 2/2022 | Choi et al. |
| 2022/0369297 | A1* | 11/2022 | Takahashi ............. H04W 72/23 |
| 2024/0224270 | A1* | 7/2024 | Xiong .................. H04B 7/0626 |
| 2024/0283589 | A1* | 8/2024 | Wang ........................ H04L 1/08 |
| 2024/0322947 | A1* | 9/2024 | Xiong ....................... H04L 1/08 |
| 2025/0081201 | A1* | 3/2025 | Harada ................. H04L 5/0094 |

OTHER PUBLICATIONS

CMCC, "Discussion on Collision Handling of HD-FDD Operation", R1-2111614, 3GPP TSG RAN WG1 #107-e, Nov. 11-19, 2021, 4 pages.

Xiaomi, "Discussion on the Remaining Issues of HD-FDD for RedCap", R1-2111579, 3GPP TSG RAN WG1 #107-e, Nov. 11-19, 2021, 3 pages.

International Search Report dated Apr. 3, 2023 issued in counterpart application No. PCT/KR2023/000310, 6 pages.

3GPP TS 38.211 V16.7.0, 3GPP, 3rd Generation Partnership Project; Technical Specification Group Radio Access Network; NR; Physical Channels and Modulation (Release 16), Sep. 2021, 134 pages.

3GPP TS 38.214 V16.7.0, 3GPP, 3rd Generation Partnership Project; Technical Specification Group Radio Access Network; NR; Physical Layer Procedures for Data (Release 16), Sep. 2021, 172 pages.

\* cited by examiner

COMMUNICATION METHOD AND APPARATUS FOR REDUCED-CAPABILITY UE IN WIRELESS COMMUNICATION SYSTEM

CROSS-REFERENCE TO RELATED APPLICATION(S)

This application is based on and claims priority under 35 U.S.C. § 119 to Korean Patent Application No. 10-2022-0004223, which was filed in the Korean Intellectual Property Office on Jan. 11, 2022, the entire disclosure of which is herein incorporated by reference.

BACKGROUND

1. Field

The disclosure relates generally to an operation of a reduced-capability user equipment (UE) and a base station in a wireless communication system, and more particularly to a reduced-capability UE and an operation method thereof considering a switching gap.

2. Description of Related Art $5^{th}$ generation (5G) mobile communication technologies define broad frequency bands to provide higher transmission rates and new services, and can be implemented in "Sub 6 GHz" bands such as 3.5 GHz, and also in "above 6 GHz" bands, which may be referred to as mmWave bands including 28 GHz and 39 GHz. In addition, the implementation of $6^{th}$ generation 6G mobile communication technologies (e.g., beyond 5G 25 systems) in terahertz bands (e.g., 95 GHz to 3THz bands) has been proposed in order to achieve transmission rates fifty times faster than 5G mobile communication technologies and ultra-low latencies one-tenth of 5G mobile communication technologies.

Since the beginning of the development of 5G mobile communication technologies, in order to support various services and to satisfy performance requirements in connection with enhanced mobile broadband (eMBB), ultra reliable low latency communications (URLLC), and massive machine-type communications (mMTC), there has been ongoing standardization regarding beamforming and massive multi-input multi-output (MIMO) for mitigating radio-wave path loss and increasing radio-wave transmission distances in mmWave, supporting numerologies (e.g., operating multiple subcarrier spacings (SCSs)) for efficiently utilizing mmWave resources and dynamic operation of slot formats, initial access technologies for supporting multi-beam transmission and broadbands, definition and operation of a bandwidth part (BWP), new channel coding methods such as a low density parity check (LDPC) code for large amount of data transmission and a polar code for highly reliable transmission of control information, layer 2 (L2) pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as vehicle-to-everything (V2X) for aiding driving determination by autonomous vehicles based on information regarding positions and states of vehicles transmitted by the vehicles and for enhancing user convenience, new radio (NR)-Unlicensed (U) aimed at system operations conforming to various regulation-related requirements in unlicensed bands, NR UE power saving, non-terrestrial network (NTN), which is UE-satellite direct communication for providing coverage in an area in which communication with terrestrial networks is unavailable, and positioning.

There has also been ongoing standardization in air interface architecture/protocol regarding technologies such as industrial Internet of things (IIoT) for supporting new services through interworking and convergence with other industries, integrated access and backhaul (IAB) for providing a node for network service area expansion by supporting a wireless backhaul link and an access link in an integrated manner, mobility enhancement including conditional handover and dual active protocol stack (DAPS) handover, and two-step random access for simplifying random access procedures (2-step RACH for NR).

There also has been ongoing standardization in system architecture/service regarding a 5G baseline architecture (e.g., service based architecture or service based interface) for combining network functions virtualization (NFV) and software-defined networking (SDN) technologies, and mobile edge computing (MEC) for receiving services based on UE positions.

As 5G mobile communication systems are commercialized, an exponentially increasing number of connected devices will be connected to communication networks, and it is expected that enhanced functions and performances of 5G mobile communication systems and integrated operations of connected devices will be necessary. To this end, new research is scheduled in connection with extended reality (XR) for efficiently supporting augmented reality (AR), virtual reality (VR), mixed reality (MR), etc., 5G performance improvement and complexity reduction by utilizing artificial intelligence (AI) and machine learning (ML), AI service support, metaverse service support, and drone communication.

Such development of 5G mobile communication systems will serve as a basis for developing new waveforms for providing coverage in terahertz bands of 6G mobile communication technologies, multi-antenna transmission technologies such as full dimensional MIMO (FD-MIMO), array antennas and large-scale antennas, metamaterial-based lenses and antennas for improving coverage of terahertz band signals, high-dimensional space multiplexing technology using orbital angular momentum (OAM), and reconfigurable intelligent surface (RIS), and also full-duplex technologies for increasing frequency efficiency of 6G mobile communication technologies and improving system networks, AI-based communication technologies for implementing system optimization by utilizing satellites and AI from the design stage and internalizing end-to-end AI support functions, and next-generation distributed computing technologies for implementing services at levels of complexity exceeding the limit of UE operation capability by utilizing ultra-high-performance communication and computing resources.

The $3^{rd}$ generation partnership project (3GPP) has started to discuss standardization of an NR reduced-capability (RedCap) UE, which allows access to a 5G communication system to perform transmission/reception of data while reducing the complexity of a UE to support technologies, such as of a sensor, a surveillance camera, and a smart watch.

SUMMARY

The disclosure has been made to address at least the above-mentioned problems and/or disadvantages and to provide at least the advantages described below.

An aspect of the disclosure is to provide a method and an apparatus in which a RedCap UE, using an NR system, may efficiently perform signal transmission and reception considering a switching gap.

Another aspect of the disclosure is to provide an apparatus and a method for a RedCap UE to effectively provide a service in a wireless communication system.

In accordance with an aspect of the disclosure, a method performed by a terminal in a communication system is provided. The method includes receiving, from a base station, information indicating positions of synchronization signal/physical broadcast channel (SS/PBCH) blocks; identifying the positions of the SS/PBCH blocks based on the information; receiving, from the base station, configuration information on physical uplink (UL) shared channel (PUSCH) repetition; identifying available resources for the PUSCH repetition by determining resources overlapped with the positions of the SS/PBCH blocks and switching intervals for the SS/PBCH blocks as unavailable resources for the PUSCH repetition; and repeatedly transmitting, to the base station, UL data on a PUSCH based on the available resources.

In accordance with another aspect of the disclosure, a method performed by a base station in a communication system is provided. The method includes transmitting, to a terminal, information indicating positions of synchronization signal/physical broadcast channel (SS/PBCH) blocks; transmitting, to the terminal, configuration information on physical uplink (UL) shared channel (PUSCH) repetition; and repeatedly receiving, from the terminal, UL data on a PUSCH based on available resources. The available resources for the PUSCH repetition is based on a determination of resources overlapping with the positions of the SS/PBCH blocks and switching intervals for the SS/PBCH blocks as unavailable resources for the PUSCH repetition.

In accordance with another aspect of the disclosure, a terminal is provided for use in a communication system. The terminal includes a transceiver; and a controller coupled with the transceiver and configured to receive, from a base station, information indicating positions of synchronization signal/physical broadcast channel (SS/PBCH) blocks, identify the positions of the SS/PBCH blocks based on the information, receive, from the base station, configuration information on physical uplink (UL) shared channel (PUSCH) repetition, identify available resources for the PUSCH repetition by determining resources overlapped with the positions of the SS/PBCH blocks and switching intervals for the SS/PBCH blocks as unavailable resources for the PUSCH repetition, and repeatedly transmit, to the base station, UL data on a PUSCH based on the available resources.

In accordance with another aspect of the disclosure, a base station is provided for use in a communication system. The base station includes a transceiver; and a controller coupled with the transceiver and configured to transmit, to a terminal, information indicating positions of synchronization signal/physical broadcast channel (SS/PBCH) blocks, transmit, to the terminal, configuration information on physical uplink (UL) shared channel (PUSCH) repetition, and repeatedly receive, from the terminal, UL data on a PUSCH based on available resources. The available resources for the PUSCH repetition is based on a determination of resources overlapped with the positions of the SS/PBCH blocks and switching intervals for the SS/PBCH blocks as unavailable resources for the PUSCH repetition.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
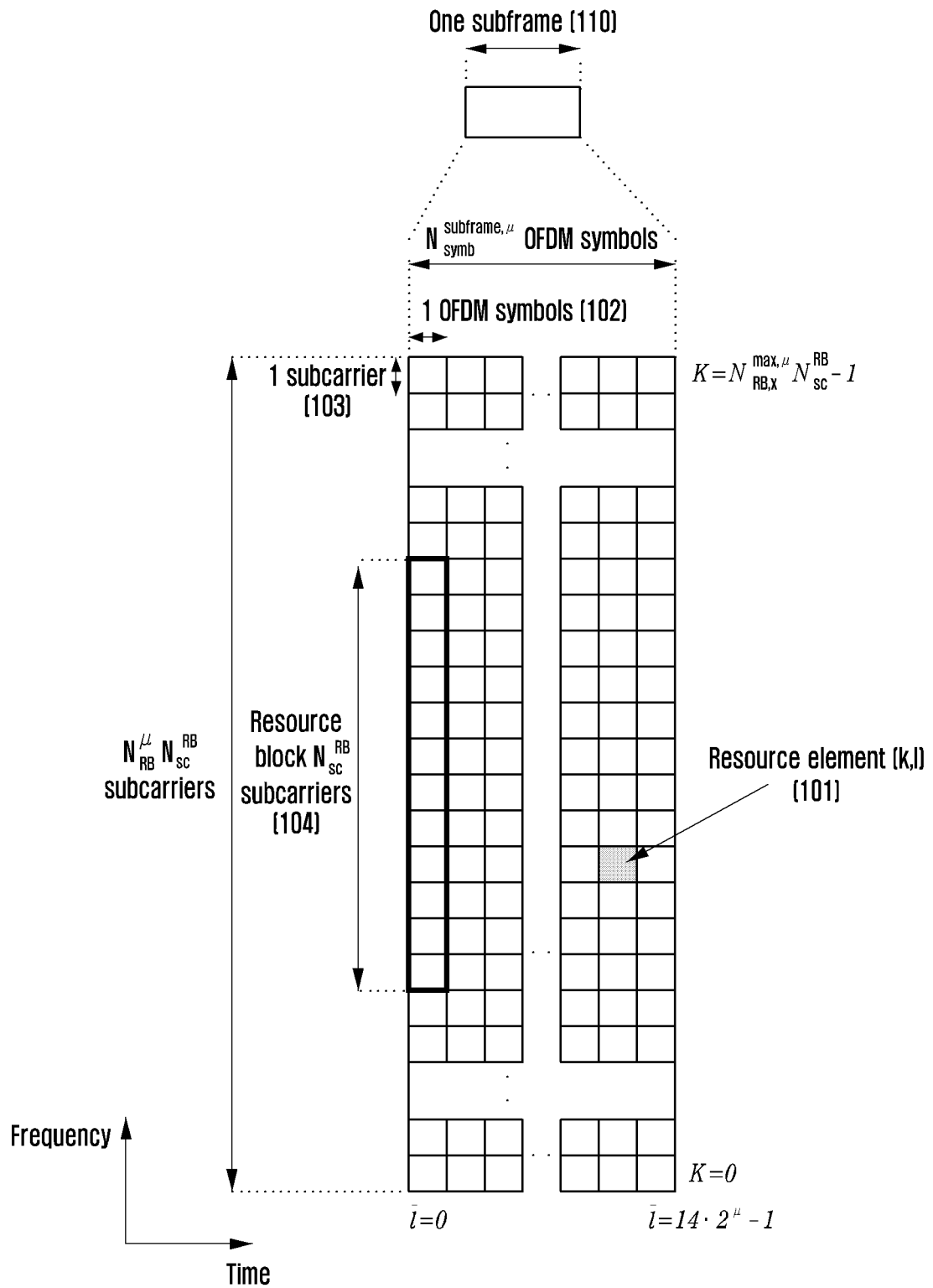
FIG. 1 illustrates a structure of a time-frequency domain, which is a radio resource domain, in a wireless communication system according to an embodiment.

Hereinafter, various embodiments of the disclosure will be described in detail with reference to the accompanying drawings.

In describing the embodiments, descriptions related to technical contents that are well-known in the art to which the disclosure pertains and/or not associated directly with the disclosure will be omitted. Such an omission of unnecessary descriptions is intended to prevent obscuring of main ideas of the disclosure and more clearly transfer the main ideas. In the accompanying drawings, some elements may be exaggerated, omitted, or schematically illustrated. Further, the size of each element does not completely reflect the actual size. In the drawings, identical or corresponding elements may be provided with identical or corresponding reference numerals.

The disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims.

The terms which will be described below are terms defined in consideration of the functions in the disclosure, and may be different according to users, intentions of the users, or customs. Therefore, the definitions of the terms should be made based on the content throughout the specification.

In the following description, a base station may be an entity that allocates resources to terminals, e.g., a gNode B, an eNode B, a Node B, an access point (AP), a wireless access unit, a base station controller, or a node on a network. A terminal may include a UE, a mobile station (MS), a terminal, a cellular phone, a smartphone, a smart watch, a wearable device, a computer, and various types of multimedia devices capable of performing communication functions.

Herein, a DL refers to a radio link via which a base station transmits a signal to a terminal, and a UL refers to a radio link via which a terminal transmits a signal to a base station.

Although long term evolution (LTE) or LTE-Advanced (LTE-A) systems may be described below by way of example, the embodiments of the disclosure may also be applied to other communication systems having similar technical backgrounds or channel types. Examples of such communication systems may include 5G mobile communication technologies (and NR) developed beyond LTE-A, and in the following description, the concept of "5G" may cover exiting LTE, LTE-A, or other similar services. In addition, based on determinations by those skilled in the art, the embodiments of the disclosure may also be applied to other communication systems through some modifications without significantly departing from the scope of the disclosure.

Herein, each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instructions that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Each block of the flowchart illustrations may also represent a module, segment, or portion of code, which includes one or more executable instructions for implementing the specified logical function(s).

In some alternative implementations, the functions noted in the blocks may occur out of the illustrated order. For example, two blocks shown in succession may in fact be executed substantially concurrently or the blocks may sometimes be executed in the reverse order, depending upon the functionality involved.

Herein, the term "unit" may refer to a software element or a hardware element, such as a field programmable gate array (FPGA) or an application specific integrated circuit (ASIC), which performs a predetermined function. However, the term "unit" does not always have a meaning limited to software or hardware. A "unit" may be constructed either to be stored in an addressable storage medium or to execute one or more processors. Therefore, a unit may include software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the unit may be either combined into a smaller number of elements, or a unit, or divided into a larger number of elements, or a unit. The elements and units may be implemented to reproduce one or more central processing units (CPUs) within a device or a secure multimedia card. Further, a "unit" may include one or more processors.

While some of the embodiments herein are described in connection with Internet of Things (IoT) services (e.g., an industrial wireless sensor network (IWSN), surveillance cameras, or wearables), the embodiments of the disclosure are not limited thereto. A combination of all or some of one or more embodiments described herein may be used for DL reception and UL transmission methods corresponding to other additional services. Therefore, modifications may be made to the embodiments of the disclosure in such a range as not to significantly depart from the scope of the disclosure under the determination by a person of ordinary skill in the art).

A wireless communication system is advancing to a broadband wireless communication system for providing high-speed and high-quality packet data services using communication standards, such as high-speed packet access (HSPA) of 3GPP, LTE (or evolved universal terrestrial radio access (E-UTRA)), LTE-A, LTE-Pro, high-rate packet data (HRPD) of 3GPP2, ultra-mobile broadband (UMB), Institute of Electrical and Electronics Engineers (IEEE) 802.16e, etc., as well as typical voice-based services.

As an example of a broadband wireless communication system, an LTE system employs an orthogonal frequency division multiplexing (OFDM) scheme in a DL and employs a single carrier frequency division multiple access (SC-FDMA) scheme in a UL. The UL indicates a radio link through which a UE (or an MS) transmits data or control signals to a base station (e.g., a eNode B), and the DL indicates a radio link through which the base station transmits data or control signals to the UE. The above multiple access scheme separates data or control information of respective users by allocating and operating time-frequency resources for transmitting the data or control information for each user in order to avoid overlapping each other, i.e., to establish orthogonality.

Since a 5G communication system, which is a post-LTE communication system, should reflect various requirements of users, service providers, etc., services satisfying various requirements should be supported. The services considered in the 5G communication system include eMBB communication, massive mMTC, URLLC, etc.

eMBB is intended to provide a higher data rate than is supported by existing LTE, LTE-A, or LTE-Pro. For example, in a 5G communication system, eMBB should provide a peak data rate of 20 Gbps in the DL and a peak data rate of 10 Gbps in the UL for a single base station.

The 5G communication system should also provide an increased user-perceived data rate to the UE, as well as the maximum data rate. In order to satisfy such requirements, transmission/reception technologies including a further enhanced MIMO transmission technique should be improved. In addition, the data rate for the 5G communication system may be obtained using a frequency bandwidth of more than 20 MHz in a frequency band of 3 to 6 GHz or 6 GHz or more, instead of transmitting signals using a transmission bandwidth of up to 20 MHz in a band of 2 GHz used in LTE.

In addition, mMTC is intended to support application services such as IoT in the 5G communication system. Accordingly, mMTC should support the connections of a large number of UEs in a cell, enhance coverage of UEs, improve battery time, reduce cost of a UE, etc., in order to effectively provide the IoT. Since the IoT provides communication functions while being provided to various sensors and various devices, it should support a large number of UEs (e.g., 1,000,000 UEs/km2) in a cell. In addition, the UEs supporting mMTC may require wider coverage than those of other services provided by the 5G communication system because the UEs are likely to be located in a shadow area, such as a basement of a building, which is not covered by the cell due to the nature of the service. A UE supporting mMTC should also be configured to be inexpensive, and may require a very long battery life-time, such as 10 to 15 years, because it may be difficult to frequently replace the battery of such a UE.

URLLC, which is a cellular-based mission-critical wireless communication service, may be used for remote control for robots or machines, industrial automation, unmanned aerial vehicles, remote health care, emergency alert, etc. Thus, URLLC should provide communication with ultra-low latency and ultra-high reliability. For example, a service supporting URLLC should satisfy an air interface latency of less than 0.5 ms, and a packet error rate of 10-5 or less. Therefore, for the services supporting URLLC, a 5G system should provide a transmit time interval (TTI) shorter than those of other services, and should assign a large number of resources in a frequency band in order to secure reliability of a communication link.

The three services in the 5G communication system described above, i.e., eMBB, URLLC, and mMTC, may also be multiplexed and transmitted in a single system. In this case, different transmission/reception techniques and transmission/reception parameters may be used between services in order to satisfy different requirements of the respective services.

The frame structure of the 5G system is described below in more detail with reference to the drawings. Hereinafter, as a wireless communication system to which the disclosure is applied, the configuration of the 5G system is described as an example for convenience of explanation. However, embodiments of the disclosure may also be applied to post-5G systems or other communication systems in the same or similar manner.

FIG. 1 illustrates a structure of a time-frequency domain, which is a radio resource domain, in a wireless communication system to which the disclosure is applied.

Referring to FIG. 1, a horizontal axis represents a time domain, and a vertical axis represents a frequency domain. A basic unit of a resource in the time and frequency domain is a resource element (RE) 101, which may be defined as an OFDM (or discrete Fourier transform spread OFDM (DFT-s-OFDM)) symbol 102 on the time domain, and a subcarrier 103 on the frequency domain. $N_{SC}^{RB}$ (e.g., 12) consecutive REs, which represent the number of subcarriers per resource block (RB) in the frequency domain, may constitute RB 104. In addition, $N_{symb}^{subframe}$ consecutive OFDM symbols, which represent the number of symbols per subframe in the time domain, may constitute one subframe 110. A more detailed description of the resource structure in the 5G system can be made by making reference to the TS 38.211 section 4 standard.

Figure 2:
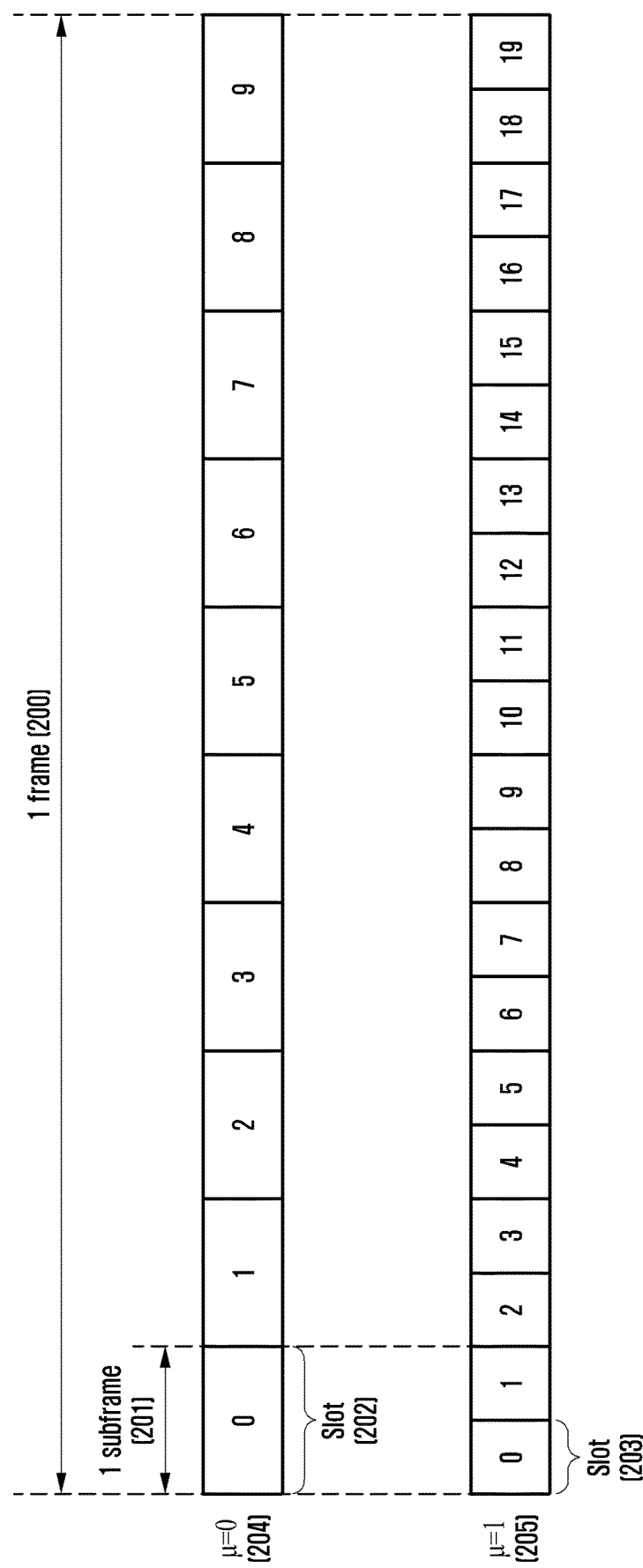
FIG. 2 illustrates a slot structure for use in a wireless communication system to which the disclosure is applied.

FIG. 2 illustrates a slot structure for use in a wireless communication system to which the disclosure is applied.

Referring to FIG. 2, a frame 200 includes a subframe 201, which includes slots 202 or 203. For example, the frame 200 may be defined as being 10 ms. The subframe 201 may be defined as being 1 ms, and thus, one frame 200 may include a total of 10 subframes 201.

In addition, the slot 202 or 203 may be defined as 14 OFDM symbols (i.e., the number ($N_{symb}^{slot}$) of symbols per slot=14).

The subframe 201 may include one or more slots 202 or 203, and the number of slots 202 or 203 per subframe 201 may differ depending on μ 204 or 205, which is a configuration value for the SCS.

In the example of FIG. 2, a slot structure of μ=0 (indicated by reference numeral 204) and a slot structure of μ=1 (indicated by reference numeral 205) are shown as the configured SCS values. In the case of μ=0 204, the subframe 201 may be configured by one slot 202, and in the case of μ=1 205, the subframe 201 may be configured by two slots 203. In other words, according to the configured SCS value μ, the number ($N_{slot}^{subframe,\mu}$) of slots per subframe may differ, and accordingly, the number ($N_{slot}^{frame,\mu}$) of slots per frame may differ. According to each SCS μ, $N_{slot}^{subframe,\mu}$ and $N_{slot}^{frame,\mu}$ may be defined as shown in Table 1 below.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

In a 5G wireless communication system, an SSB (which may be interchangeably used with synchronization signal/physical broadcast channel block, SS/PBCH block) may be transmitted for initial access of a UE. The SSB may include a primary synchronization signal (PSS), a secondary synchronization signal (SSS), and a physical broadcast channel (PBCH).

In an initial access stage in which a UE accesses a system, the UE first acquires DL time and frequency domain synchronization from a synchronization signal (SS) through a cell search and acquires a cell identifier (ID). The SS may include a PSS and an SSS. In addition, the UE receives the PBCH, transmitting a master information block (MIB), from the base station, and acquires system information related to transmission and reception, such as system bandwidth or related control information, and basic parameter values. Based on this information, the UE may perform decoding on a physical DL control channel (PDCCH) and a physical DL shared channel (PDSCH), in order to acquire a system information block (SIB). Thereafter, the UE exchanges identification-related information of the base station and the UE through a random access stage and undergoes registration and authentication to initially access the network.

An SS is a reference signal for a cell search, and, when the SS is transmitted, an SCS suitable for a channel environment, such as phase noise, for each frequency band is applied to the SS.

In the 5G system, the base station may transmit a plurality of SSBs according to the number of analog beams to be operated. For example, a PSS and an SSS may be mapped over 12 RBs and transmitted, and a PBCH may be mapped over 24 RBs and transmitted. Hereinafter, a structure in which a SS and a PBCH are transmitted in a 5G communication system will be described.

Figure 3:
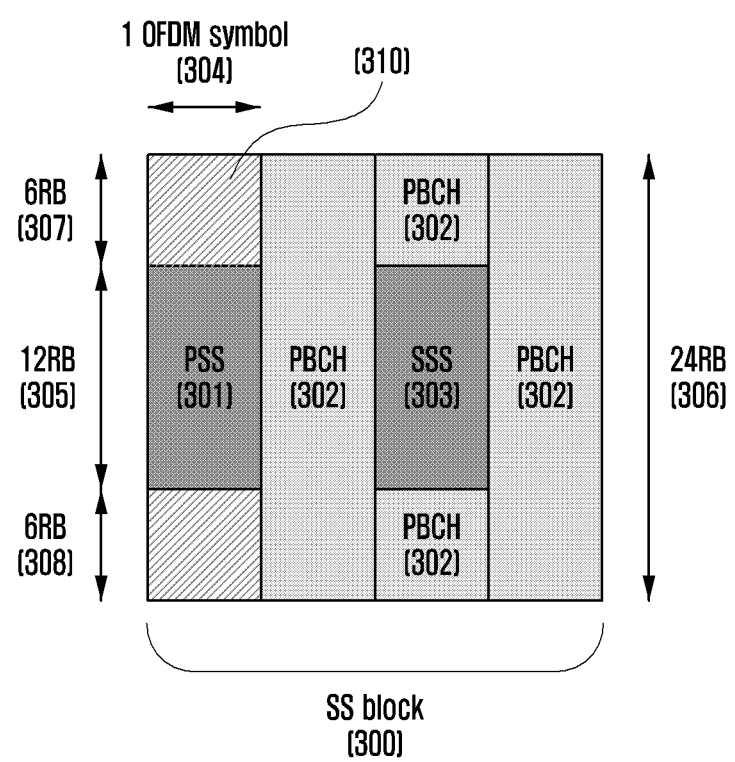
FIG. 3 illustrates a synchronization signal block (SSB) for use in a wireless communication system to which the disclosure is applied.

FIG. 3 illustrates an SSB for use in a wireless communication system to which the disclosure is applied.

Referring to FIG. 3, an SSB (or SS block) 300 includes a PSS 301, an SSS 303, and PBCHs 302.

The SSB 300 is mapped to four OFDM symbols 304 on the time axis. The PSS 301 and the SSS 303 may be transmitted in 12 RBs 305 on the frequency axis and in first and third OFDM symbols on the time axis, respectively. In the 5G system, a total of 1,008 different cell IDs may be defined and, depending on the physical layer ID of the cell, the PSS 301 may have three different values, and the SSS 303 may have 336 different values. The UE may acquire one of the (336×3=)1008 cell IDs, as a combination, through detection on the PSS 301 and the SSS 303, as shown in Equation (1).

$$N_{ID}^{cell} = 3N_{ID}^{(1)} + N_{ID}^{(2)} \quad (1)$$

In Equation (1), $N_{ID}^{(1)}$ may be estimated from the SSS 303 and has a value between 0 and 335. $N_{ID}^{(2)}$ may be estimated from the PSS 301 and has a value between 0 and 2. The UE may estimate the cell ID, i.e., $N_{ID}^{cell}$, by a combination of $N_{ID}^{(1)}$ and $N_{ID}^{(2)}$.

The PBCH 302 may be transmitted in the resource including 24 RBs 306 on the frequency axis and 6RBs 307 and 308 on both sides of each of the second and fourth OFDM symbols, except for the intermediate 12 RBs where the SSS 303 is transmitted, on the time axis.

Various pieces of system information, e.g., MIB, may be transmitted in the PBCH 302. For example, the MIB may include information as set forth in Table 2 below. The PBCH payload and the PBCH demodulation reference signal (DMRS) may include additional information below. For a more detailed description of the MIB in the 5G system, the TS 38.331 standard may be referred to.

TABLE 2

| MIB ::= | SEQUENCE { |
|---|---|
| systemFrameNumber | BIT STRING (SIZE (6)), |
| subCarrierSpacingCommon | ENUMERATED {scs15or60, |

TABLE 2-continued

| | |
|---|---|
| scs30or120}, | |
| ssb-SubcarrierOffset | INTEGER (0..15), |
| dmrs-TypeA-Position | ENUMERATED {pos2, pos3}, |
| pdcch-ConfigSIB1 | PDCCH-ConfigSIB1, |
| cellBarred | ENUMERATED {barred, notBarred}, |
| intraFreqReselection | ENUMERATED {allowed, notAllowed}, |
| spare | BIT STRING (SIZE (1)) |
| } | |

- SSB information: indicates the offset of the frequency domain of the SSB through 4 bits (ssb-SubcarrierOffset) in the MIB. The index of the SSB including the PBCH may be indirectly obtained through decoding of the PBCH DMRS and PBCH. For example, in a frequency band of 6 GHz or below, 3 bits obtained through decoding of the PBCH DMRS indicate the SSB index and, in a frequency band of 6 GHz or above, 6 bits in total, including 3 bits obtained through decoding of the PBCH DMRS and 3 bits included in the PBCH payload and obtained by PBCH decoding may indicate the SSB index including the PBCH.
- PDCCH information: indicates the SCS of the common DL control channel through 1 bit (subCarrierSpacing-Common) in the MIB and indicates the control resource set (CORESET) and the search space through 8 bits (pdcch-ConfigSIB1).
- System frame number (SFN): 6 bits (systemFrameNumber) in the MIB are used to indicate a part of the SFN. The 4 least significant bits (LSBs) of the SFN are included in the PBCH payload, and the UE may indirectly acquire the same through PBCH decoding.
- Timing information in radio frame: 1 bit (half frame) obtained through PBCH decoding and included in the PBCH payload and the SSB index described above. The UE may indirectly identify whether the SSB is transmitted in the first or second half frame of the radio frame.

Since the transmission bandwidth (12 RBs 305) of the PSS 301 and the SSS 303 and the transmission bandwidth (24 RBs 306) of the PBCH 302 are different from each other, the first OFDM symbol in which the PSS 301 is transmitted in the transmission bandwidth of the PBCH 302 has 6 RBs 307 and 308 on both sides except the intermediate 12 RBs where the PSS 301 is transmitted, and the region may be used to transmit other signals or may be empty.

All SSBs may be transmitted using the same analog beam. In other words, the PSS 301, the SSS 303, and the PBCH 302 may be transmitted through the same beam. Since the analog beam, by its nature, cannot be applied differently on the frequency axis, the same analog beam is applied to all the RBs on the frequency axis within a specific OFDM symbol to which a specific analog beam is applied. That is, all of the four OFDM symbols in which the PSS 301, the SSS 303, and the PBCH 302 are transmitted may be transmitted using the same analog beam.

Figure 4:
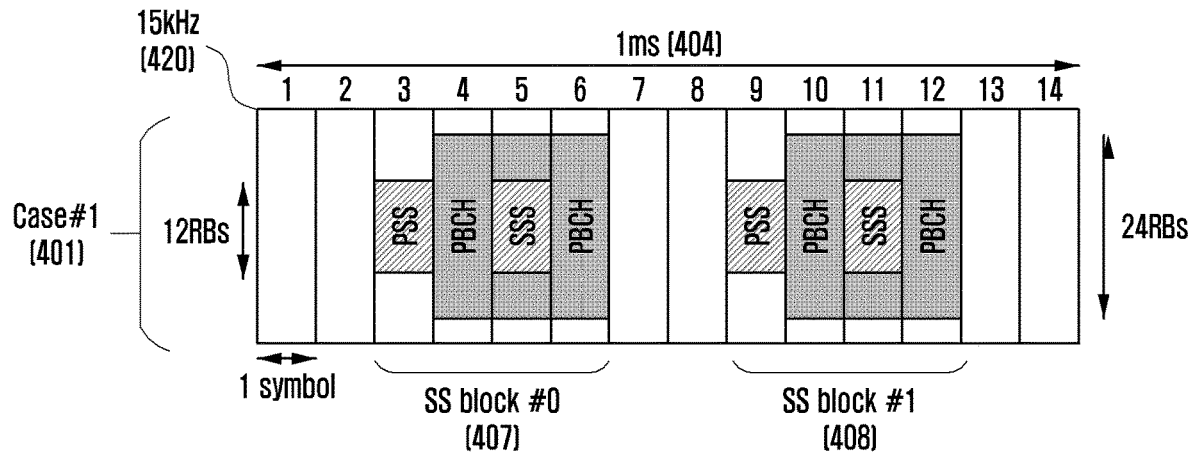
FIG. 4 illustrates transmissions of an SSB in a frequency band of 6 GHz or less in a wireless communication system to which the disclosure is applied.
Figure 4:
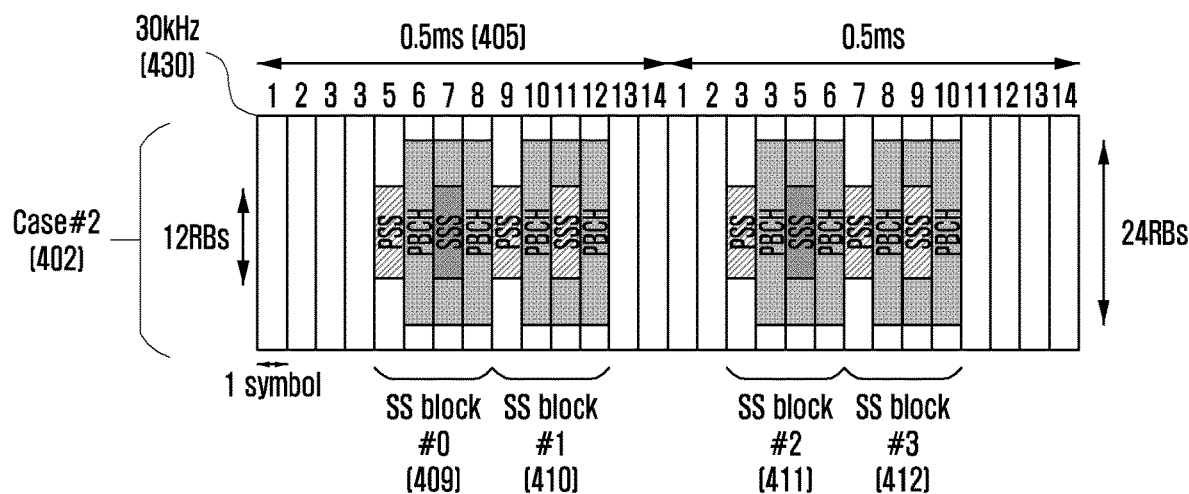
Figure 4:
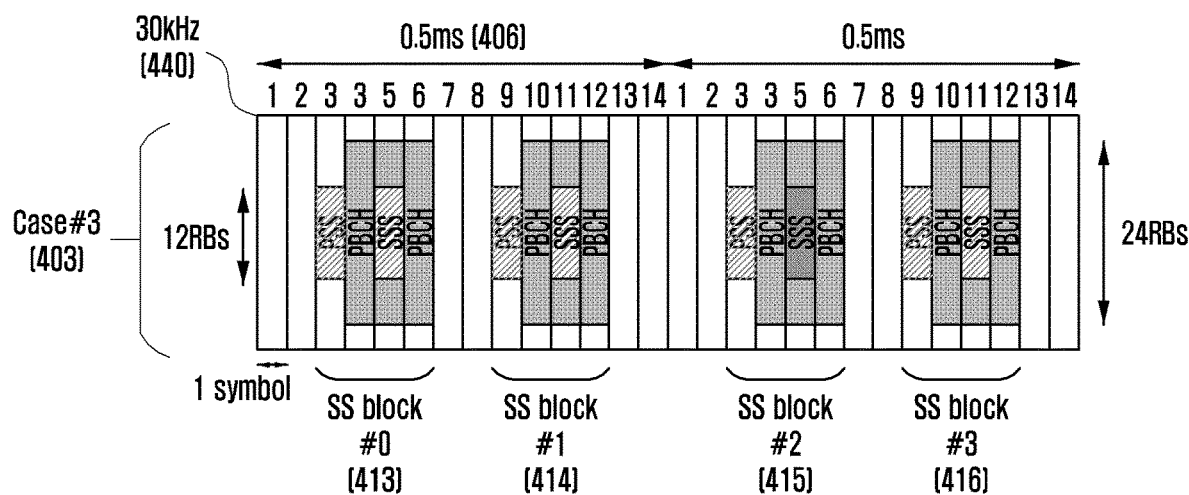

FIG. 4 illustrates transmissions of an SSB in a frequency band of 6 GHz or less in a communication system to which the disclosure is applied.

Referring to FIG. 4, in the 5G communication system, in a frequency band of 6 GHz or less, an SCS of 15 kHz (indicated by reference numeral 420) and an SCS of 30 kHz (indicated by reference numeral 430 or 440) may be used for SSB transmission. In the 15 kHz SCS 420, there is one transmission (case #1 401) for the SSB and, in the 30 kHz SCS 430 or 440, there may be two transmissions for the SSB (case #2 402 and case #3 403).

In FIG. 4, in case #1 401 of the 15 kHz SCS 420, up to two SSBs may be transmitted within 1 ms time (indicated by reference numeral 404) (or, when 1 slot includes 14 OFDM symbols, it corresponds to a length of 1 slot).

In FIG. 4, SSB #0 407 and SSB #1 408 are shown. For example, the SSB #0 407 may be mapped to four consecutive symbols from the third OFDM symbol, and the SSB #1 408 may be mapped to four consecutive symbols from the ninth OFDM symbol.

Different analog beams may be applied to the SSB #0 407 and the SSB #1 408. In addition, the same beam may be applied to all of the 3rd to 6th OFDM symbols to which the SSB #0 407 is mapped, and the same beam may be applied to all of the 9th to 12th OFDM symbols to which the SSB #1 408 is mapped. In the 7th, 8th, 13th, and 14th OFDM symbols to which no SSB is mapped, an analog beam to be used may be freely determined under the determination of the base station.

In case #2 402 of the 30 kHz SCS 430, up to two SSBs may be transmitted within 0.5 ms time (indicated by reference numeral 405) (or, when 1 slot includes 14 OFDM symbols, it corresponds to a length of 1 slot), and accordingly, up to four SSBs may be transmitted within 1 ms (or, when 1 slot includes 14 OFDM symbols, it corresponds to a length of 2 slots).

FIG. 4 illustrates an example in which SSB #0 409, SSB #1 410, SSB #2 411, and SSB #3 412 are transmitted within 1 ms (i.e., two slots). In this case, the SSB #0 409 and the SSB #1 410 may be mapped from the 5th OFDM symbol and the 9th OFDM symbol, respectively, of the first slot, and the SSB #2 411 and the SSB #3 412 may be mapped from the 3rd OFDM symbol and the 7th OFDM symbol, respectively, of the second slot. Different analog beams may be applied to the SSB #0 409, the SSB #1 410, the SSB #2 411, and the SSB #3 412. The same analog beam may be applied to the 5th to 8th OFDM symbols of the first slot in which the SSB #0 409 is transmitted, the 9th to 12th OFDM symbols of the first slot in which the SSB #1 410 is transmitted, the 3rd to 6th symbols of the second slot in which the SSB #2 411 is transmitted, and the 7th to 10th symbols of the second slot in which the SSB #3 412 is transmitted. In the OFDM symbols to which no SSB is mapped, an analog beam to be used may be freely determined under the determination of the base station.

In case #3 403 of the 30 kHz SCS 440, up to two SSBs may be transmitted within 0.5 ms time (indicated by reference numeral 406) (or, when 1 slot includes 14 OFDM symbols, corresponding to a length of 1 slot), and accordingly, up to four SSBs may be transmitted within 1 ms (or, when 1 slot includes 14 OFDM symbols, corresponding to a length of 2 slots).

FIG. 4 illustrates an example in which SSB #0 413, SSB #1 414, SSB #2 415, and SSB #3 416 are transmitted within 1 ms (i.e., two slots). Here, the SSB #0 413 and the SSB #1 414 may be mapped from the 3rd OFDM symbol and the 9th OFDM symbol, respectively, of the first slot, and the SSB #2 415 and the SSB #3 416 may be mapped from the 3rd OFDM symbol and the 9th OFDM symbol, respectively, of the second slot.

Different analog beams may be used for the SSB #0 413, the SSB #1 414, the SSB #2 415, and the SSB #3 416.

As described above in connection with examples, the same analog beam may be used in all four OFDM symbols in which each SSB is transmitted, and which beam is to be used in OFDM symbols to which no SSB is mapped may be freely determined by the base station.

Figure 5:
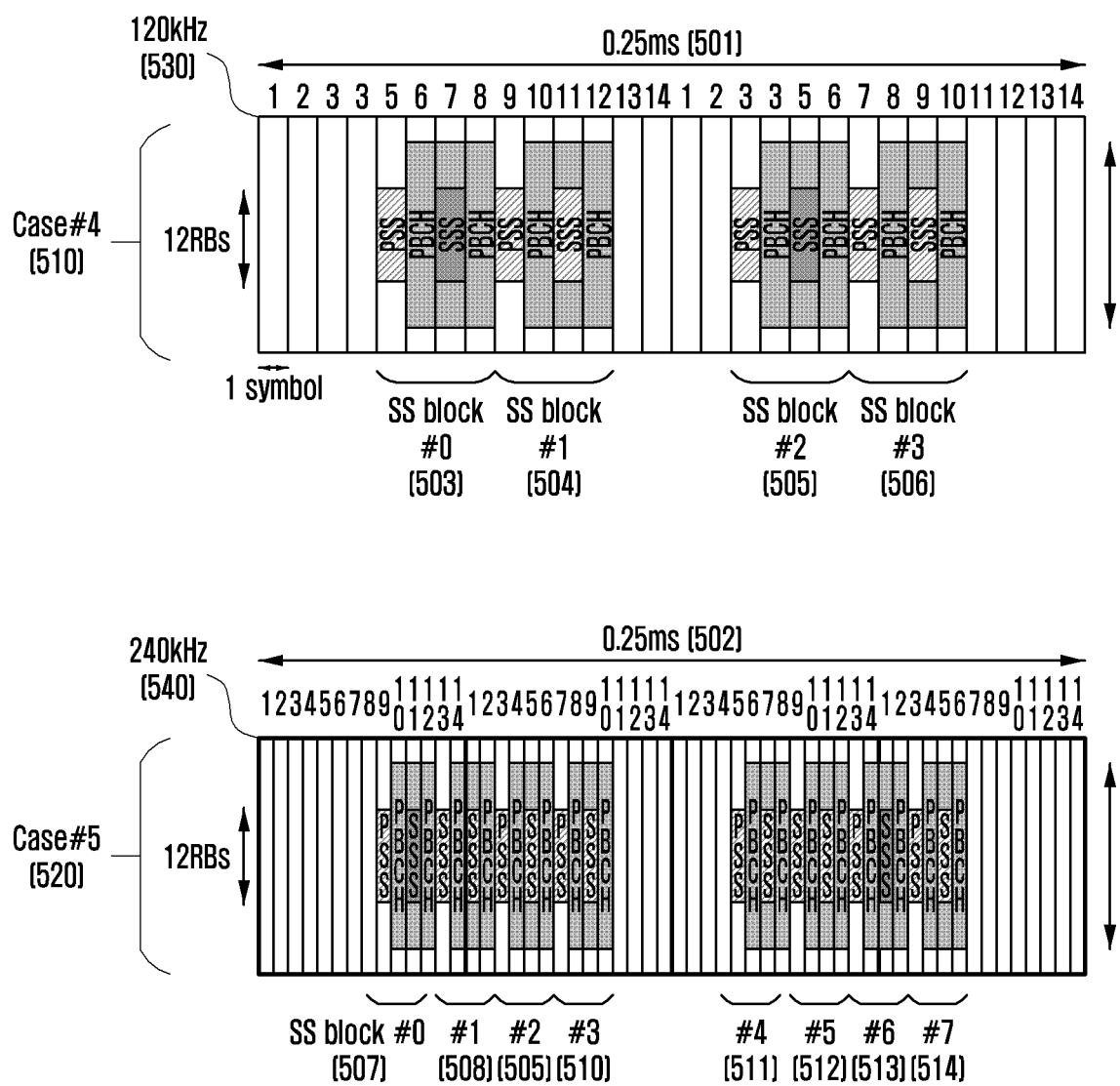
FIG. 5 illustrates transmissions of an SSB in a frequency band of 6 GHz or more in a wireless communication system to which the disclosure is applied.

FIG. 5 illustrates transmissions of an SSB in a frequency band of 6 GHz or more considered in a wireless communication system to which the disclosure is applied.

Referring to FIG. 5, in the 5G communication system, in a frequency band of 6 GHz or more, the SCS of 120 kHz (indicated by reference numeral 530) in case #4 510 and the SCS of 240 kHz (indicated by reference numeral 540) in case #5 520 may be used for SSB transmission.

In case #4 510 of the 120 kHz SCS 530, up to four SSBs may be transmitted within 0.25 ms time (indicated by reference numeral 501) (or, when 1 slot includes 14 OFDM symbols, corresponding to a length of 2 slots).

FIG. 5 illustrates an example in which SSB #0 503, SSB #1 504, SSB #2 505, and SSB #3 506 are transmitted within 0.25 ms (i.e., two slots). In this case, the SSB #0 503 and the SSB #1 504 may be mapped to four consecutive symbols from the 5th OFDM symbol and to four consecutive symbols from the 9th OFDM symbol, respectively, of the first slot, and the SSB #2 505 and the SSB #3 506 may be mapped to four consecutive symbols from the 3rd OFDM symbol and to four consecutive symbols from the 7th OFDM symbol, respectively, of the second slot.

As described above in connection with the above embodiments, different analog beams may be used for the SSB #0 503, the SSB #1 504, the SSB #2 505, and the SSB #3 506. The same analog beam may be used in all four OFDM symbols in which each SSB is transmitted, and which beam is used in OFDM symbols to which no SSB is mapped may be freely determined by the base station.

In case #5 520 of the 240 kHz SCS 540, up to eight SSBs may be transmitted within 0.25 ms time (indicated by reference numeral 502) (or, when 1 slot includes 14 OFDM symbols, corresponding to a length of 4 slots).

FIG. 5 illustrates an example in which SSB #0 507, SSB #1 508, SSB #2 509, SSB #3 510, SSB #4 511, SSB #5 512, SSB #6 513, and SSB #7 514 are transmitted within 0.25 ms (i.e., 4 slots). In this case, the SSB #0 507 and the SSB #1 508 may be mapped to four consecutive symbols from the 9th OFDM symbol and to four consecutive symbols from the 13th OFDM symbol, respectively, of the first slot, the SSB #2 509 and the SSB #3 510 may be mapped to four consecutive symbols from the 3rd OFDM symbol and to four consecutive symbols from the 7th OFDM symbol, respectively, of the second slot, the SSB #4 511, the SSB #5 512, and the SSB #6 513 may be mapped to four consecutive symbols from the 5th OFDM symbol, to four consecutive symbols from the 9th OFDM symbols, and to four consecutive symbols from the 13th OFDM symbol, respectively, of the third slot, and the SSB #7 514 may be mapped to four consecutive symbols from the 3rd OFDM symbol of the fourth slot.

As described in the above embodiment, different analog beams may be used in the SSB #0 507, the SSB #1 508, the SSB #2 509, the SSB #3 510, the SSB #4 511, the SSB #5 512, the SSB #6 513, and the SSB #7 514. The same analog beam may be used in all four OFDM symbols in which each SSB is transmitted, and which beam is used in OFDM symbols to which no SSB is mapped may be freely determined by the base station.

Figure 6:
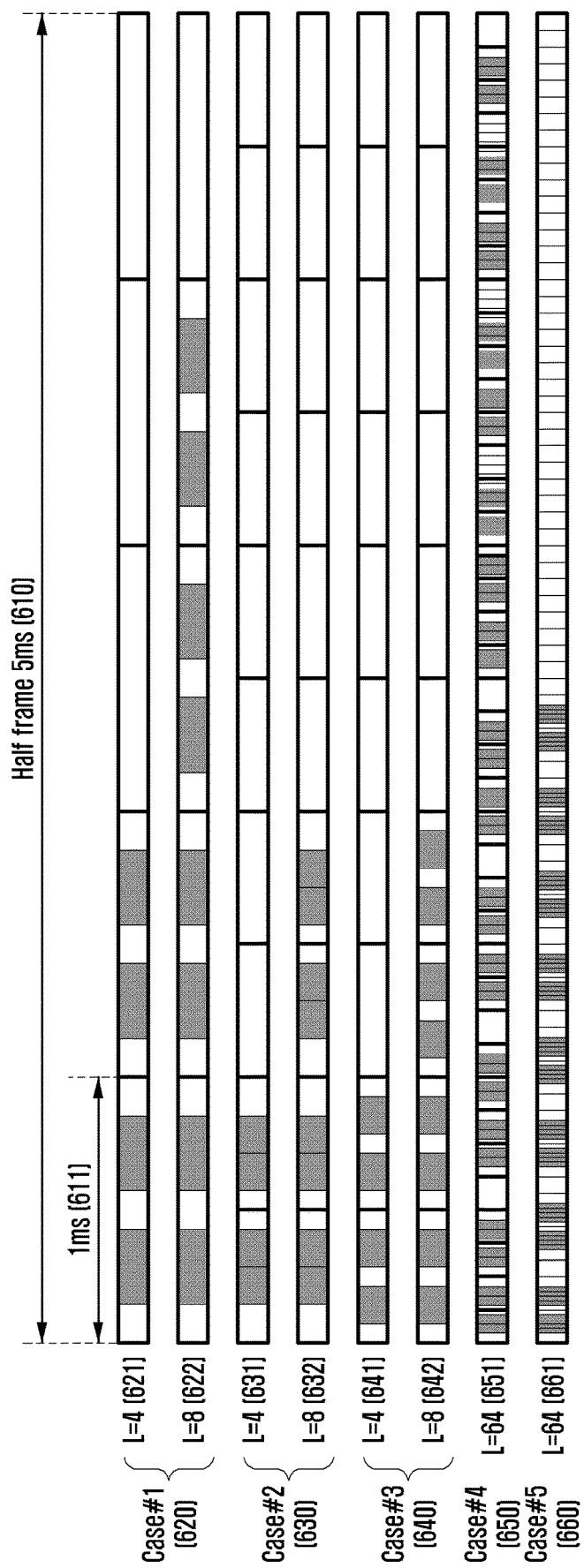
FIG. 6 illustrates transmissions of an SSB according to an SCS within 5 ms in a wireless communication system to which the disclosure is applied.

FIG. 6 illustrates transmissions of an SSB according to an SCS within 5 ms time in a wireless communication system to which the disclosure is applied.

Referring to FIG. 6, in the 5G communication system, the SSB may be transmitted periodically every 5 ms (corresponding to 5 subframes or half frames, 610).

In a frequency band of 3 GHz or less, up to four SSBs may be transmitted within 5 ms time (indicated by reference numeral 610). Up to 8 SSBs may be transmitted in a frequency band above 3 GHz and below 6 GHz. In a frequency band above 6 GHz, up to 64 SSBs may be transmitted. As described above, the SCSs of 15 kHz and 30 kHz may be used at frequencies 6 GHz or less.

In FIG. 6, in case #1 620 of the 15 kHz SCS configured by one slot, in a frequency band of 3 GHz or less, SSBs may be mapped to the first slot and the second slot so that up to four SSBs 621 may be transmitted, and in a frequency band above 3 GHz and below 6 GHz, SSBs may be mapped to the first, second, third, and fourth slots, and thus up to eight SSBs 622 may be transmitted.

In case #2 630 or case #3 640 of the 30 kHz SCS configured by two slots, in a frequency band of 3 GHz or less, SSBs may be mapped starting from the first slot, and thus up to four SSBs 631 and 641 may be transmitted, and in a frequency band above 3 GHz and below 6 GHz, SSBs may be mapped starting from the first and third slots, and thus up to eight SSBs 632 and 642 may be transmitted.

The SCSs of 120 kHz and 240 kHz may be used at frequencies above 6 GHz. In FIG. 6, in case #4 650 of the 120 kHz SCS configured by two slots, in a frequency band above 6 GHz, SSBs may be mapped starting from the 1st, 3rd, 5th, 7th, 11th, 13th, 15th, 17th, 21st, 23rd, 25th, 27th, 31st, 33rd, 35th, and 37th slots and thus up to 64 SSBs 651 may be transmitted.

In case #5 660 of the 240 kHz SCS configured by 4 slots, in a frequency band above 6 GHz, SSBs may be mapped starting from the 1 st, 5th, 9th, 3rd, 21st, 25th, 29th, and 33rd slots and thus up to 64 SSBs 661 may be transmitted.

The UE may acquire the SIB after decoding the PDCCH and the PDSCH based on the system information included in the received MIB. The SIB includes at least one of UL cell bandwidth, random access parameters, paging parameters, or parameters related to UL power control.

As indicated above, 3GPP is currently discussing a RedCap UE based on NR. Upon an initial cell access to a cell (or a base station), the RedCap UE may obtain cell synchronization by receiving the SSB as illustrated in FIG. 4 or FIG. 5 and then determine whether the cell supports the RedCap UE by obtaining the MIB or SIB or via a random access process. In addition, when it is determined that the cell supports the RedCap UE, the RedCap UE may transmit capability information about the bandwidth size supported by the RedCap UE in the cell, whether full-duplex communication or half-duplex communication is supported, and the number of transmission or reception antennas equipped (or supported) to the base station, so as to notify the base station that the UE attempting to access is a RedCap UE. Alternatively, if half-duplex communication support is considered as key implementation for a RedCap UE, whether or not the half-duplex communication is supported may be omitted from capability information.

The base station may configure a separate random access resource for each of a RedCap UE, a RedCap UE supporting duplex communication, and a RedCap UE supporting half duplex communication, and may transmit configuration information on the random access resource to the RedCap UE through system information. The system information for transmission of the information on the random access resource may be separately transmitted system information that is distinguished from system information for a UE supporting a standard of a different version within a cell, and the base station may distinguish whether the UE supporting the standard of a different version performs random access or the RedCap UE performs random access by configuring separate random access resources for the UE supporting the standard of a different version and the RedCap UE.

Alternatively, the base station may configure a common random access resource for all UEs within the cell instead of configuring a separate random access resource for the RedCap UE. In this case, configuration information on the random access resource may be transmitted to all UEs in the cell through system information, and the UE having received the system information may perform random access on the random access resource.

Thereafter, the UE may finish the random access process and proceed to an RRC connected mode for transmission/reception of data to/from the cell.

In general, the UE may form a radio link with a network through a random access procedure based on the system information and synchronization with the network obtained in the cell search process of the cell. For random access, a contention-based or contention-free scheme may be used. When the UE performs cell selection and reselection in the stage of initial access to the cell, a contention-based random access scheme may be used for, e.g., switching from an RRC_IDLE (radio resource control (RRC) idle) state to an RRC_CONNECTED (RRC connected) state. Contention-free random access may be used in case that DL data arrives, in the case of handover, or in the case of re-establishing UL synchronization for location measurement.

Table 3 below illustrates conditions (events) under which a random access procedure is triggered in the 5G system. For details, TS 38.300 may be referred to.

TABLE 3

Initial access from RRC_IDLE;
RRC Connection Re-establishment procedure;
DL or UL data arrival during RRC_CONNECTED when UL synchronization status is "non-synchronized";
UL data arrival during RRC_CONNECTED when there are no PUCCH resources for SR available;
SR failure;
Request by RRC upon synchronous reconfiguration (e.g. handover);
Transition from RRC_INACTIVE;
To establish time alignment for a secondary TAG;
Request for Other SI (see clause 7.3);
Beam failure recovery.

Figure 7:
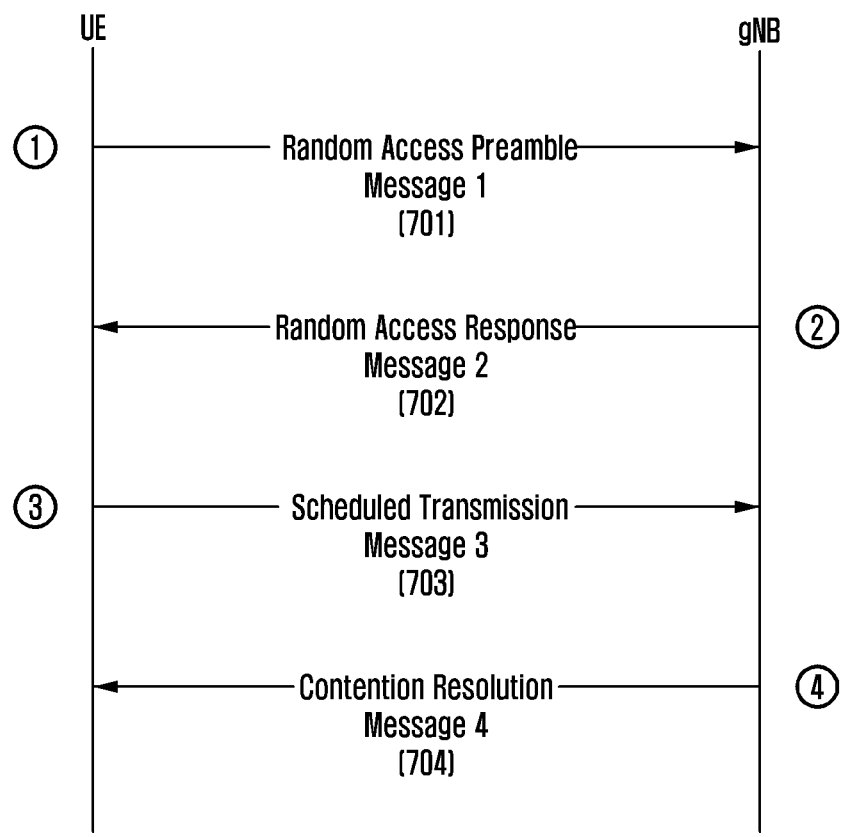
FIG. 7 illustrates a four-stage random access procedure in a wireless communication system to which the disclosure is applied.

FIG. 7 illustrates a random access procedure in a wireless communication system to which the disclosure is applied. More specifically, FIG. 7 illustrates a contention-based random access procedure.

Referring to FIG. 7, a base station (e.g., a gNB) transmits an SSB as described above. For example, the base station may periodically transmit the SSB using beam sweeping. The base station may transmit SSBs including PSS and SSS signals and PBCH signals using up to 64 different beams for 5 ms, and a plurality of SSBs may be transmitted using different beams. The UE detects (selects) the SSB having an optimal beam direction (e.g., a beam direction in which the received signal strength is highest or is larger than a predetermined threshold), and transmits a preamble using a physical random access channel (PRACH) resource associated with the detected SSB.

More specifically, in step 701 of the random access procedure, the UE transmits a random access preamble (or message 1) to the base station. The base station then measures a transmission latency value between the UE and the base station and performs UL synchronization.

The UE may transmit a random access preamble randomly selected from a random access preamble set previously given by system information. Further, the initial transmission power of the random access preamble may be determined according to the pathloss between the base station and the UE measured by the UE. In addition, the UE may determine the transmission beam direction (or transmission beam or beam) of the random access preamble based on the SSB received from the base station, and apply the determined transmission beam direction to transmit the random access preamble.

In step 702, the base station transmits, to the UE, a response (random access response (RAR) or message 2) to the detected random access attempt. The base station transmits a UL transmission timing control command to the UE from the transmission latency value measured from the random access preamble received in the first stage. Further, the base station transmits a UL resource and power control command to be used by the UE as scheduling information. The scheduling information may include control information for the UL transmission beam of the UE. The RAR may be transmitted through the PDSCH and may include at least one of a random access preamble sequence index detected by a network (or the base station), a temporary cell radio network temporary ID (TC-RNTI), a UL scheduling grant, or a timing advance (TA) value.

In the event that the UE fails to receive the RAR, which is scheduling information for message 3, from the base station, for a predetermined period of time in step 702, the procedure returns to step 701.

Upon performing step 701 again, the UE increases the transmission power of the random access preamble by a predetermined step and transmits the same (this is referred to as power ramping), thereby increasing the probability of the base station to receive the random access preamble.

In step 703, the UE transmits, to the base station, UL information (scheduled transmission or message 3) including its own UE ID (which may be referred to as a UE contention resolution (CR) identity) (or, a valid UE ID if the UE has a valid UE ID in the cell (i.e., cell radio network temporary ID (C-RNTI)) before starting the random access procedure) through the UL data channel (physical UL shared channel (PUSCH) using the UL resource allocated by the base station in step 702. The transmission timing of the UL data channel for transmitting the message 3 follows the UL transmission timing control command received from the base station in step 702. Further, the transmission power of the UL data channel for transmitting the message 3 is determined considering the power control command received from the base station in step 702 and the power ramping value of the random access preamble. The UL data channel for transmitting the message 3 is the first UL data signal transmitted by the UE to the base station after the UE transmits the random access preamble.

In step 704, when the base station determines that the UE has performed random access without collision with other UEs, the base station transmits, to the UE, a message (a CR message or message 4) including the ID of the UE that has transmitted the UL data in step 703.

In this regard, in case that a plurality of UEs receive the same TC-RNTI in the second stage 702, each of the plurality of UEs that have received the same TC-RNTI transmits message 3 including its own UE ID (UE CR identity) in the third stage 703 to the base station, and the base station transmits message 4 including one ID among the IDs of the plurality of UEs to resolve the contention. When the UE receives message 4 (CR message) including its own UE ID from the base station in the fourth stage 704 (or in case that message 3 including the UE ID (C-RNTI) is transmitted in the third stage 703, and UE specific control information including a UE ID (C-RNTI)-based cyclic redundancy check (CRC) is received via a PDCCH in step 704), the UE determines that random access has succeeded. Accordingly, it may be identified that among the plurality of UEs that have received the same TC-RNTI from the base station, a UE that has identified that its own UE ID is included in message 4 (CR message) has succeeded in random access. In addition, the UE transmits a hybrid automatic repeat request (HARQ)-acknowledgment (ACK)/negative acknowledgement (NACK) indicating whether the message 4 has been successfully received to the base station through the physical UL control channel (PUCCH).

In the event that the base station fails to receive a data signal from the UE because data transmitted by the UE in step 703, and data from another UE collide with each other, the base station does not perform any further data transmission to the UE. Accordingly, when the UE fails to receive the data transmitted from the base station in step 704 for a predetermined period of time, it is determined that the random access procedure has failed and the procedure starts again from step 701.

As described above, in step 701 of the random access procedure, the UE may transmit a random access preamble on a PRACH. There are 64 available preamble sequences in each cell, and 4 long preamble formats and 9 short preamble formats may be used according to the transmission type. The UE may generate 64 preamble sequences using the root sequence index and cyclic shift value signaled as system information and randomly select one sequence and uses the selected sequence as a preamble.

The base station may provide the UE with control information (or configuration information) indicating which time-frequency resource may be used for the PRACH, via at least one of the SIB, higher layer signaling (RRC information), or DL control information (DCI). Frequency resources for PRACH transmission indicate to the UE the start RB point of transmission, and the number of RBs used is determined according to the preamble format transmitted through the PRACH and the applied SCS. The time resource for PRACH transmission may provide an indication of a preconfigured PRACH configuration period, a subframe index and start symbol including a PRACH transmission time (or a PRACH occasion), and the number of PRACH transmission times in the slot as illustrated in Table 4 below, via the PRACH configuration index (0 to 255). Through the PRACH configuration index, the random access configuration information included in the SIB, and the index of the SSB selected by the UE, the UE may identify the time and frequency resources for transmitting the random access preamble, and transmit the selected sequence, as the preamble, to the base station.

TABLE 4

| PRACH Config Index | Preamble format | $n_{SFN}$ mod x = y | | Subframe # | Starting symbol | Number of PRACH slots within a subframe | $N_t^{RA,slot}$, number of time-domain PRACH occasions within a PRACH slot | $N_{dur}^{RA}$, PRACH duration |
|---|---|---|---|---|---|---|---|---|
| | | x | y | | | | | |
| 0 | 0 | 16 | 1 | 1 | 0 | — | — | 0 |
| 1 | 0 | 16 | 1 | 4 | 0 | — | — | 0 |
| 2 | 0 | 16 | 1 | 7 | 0 | — | — | 0 |
| 3 | 0 | 16 | 1 | 9 | 0 | — | — | 0 |
| 4 | 0 | 8 | 1 | 1 | 0 | — | — | 0 |
| 5 | 0 | 8 | 1 | 4 | 0 | — | — | 0 |
| 6 | 0 | 8 | 1 | 7 | 0 | — | — | 0 |
| 7 | 0 | 8 | 1 | 9 | 0 | — | — | 0 |
| 8 | 0 | 4 | 1 | 1 | 0 | — | — | 0 |
| 9 | 0 | 4 | 1 | 4 | 0 | — | — | 0 |
| 10 | 0 | 4 | 1 | 7 | 0 | — | — | 0 |
| ... | | | | | | | | |
| 104 | A1 | 1 | 0 | 1, 4, 7 | 0 | 2 | 6 | 2 |
| ... | | | | | | | | |
| 251 | C2 | 1 | 0 | 2, 7 | 0 | 2 | 2 | 6 |
| 252 | C2 | 1 | 0 | 1, 4, 7 | 0 | 2 | 2 | 6 |
| 253 | C2 | 1 | 0 | 0, 2, 4, 6, 8 | 0 | 2 | 2 | 6 |
| 254 | C2 | 1 | 0 | 0, 1, 2, 3, 4, 5, 6, 7, 8, 9 | 0 | 2 | 2 | 6 |
| 255 | C2 | 1 | 0 | 1, 3, 5, 7, 9 | 0 | 2 | 2 | 6 |

In an LTE communication system, in order to support application services such as IoT, LTE-MTC technology has been developed. LTE-MTC is an IoT-dedicated access technology in which low-power design, low-cost equipment, low construction cost, stable coverage, and large-scale UE access implementation are considered as key requirements. LTE-MTC technology provides a longer battery life for UEs based on a low-power design by reducing the transmission rate and transmission bandwidth compared to the LTE service and introducing a power saving mode. The transmission rate and transmission bandwidth may be greatly reduced, and the complexity of a communication modem is also reduced. Thus, it is possible to implement a low-cost UE. Further, LTE-MTC may adopt a single-antenna technology, rather than multi-antenna (i.e., MIMO) technology, thereby minimizing power consumption. Further, since a legacy LTE network may be used as it is, the legacy LTE service and LTE-MTC service may be supported simultaneously without additional investment.

Further, in order to have no influence on the UE receiving the legacy LTE service, the base station may indicate that a cell having transmitted the PBCH also supports the LTE-MTC service by including additional information in reserved bits of the MIB included in the PBCH for the legacy LTE service, and may indirectly indicate the position of the resource in which the SIB (SIB type 1-bandwidth reduced (SIB1-BR)) for LTE-MTC service is transmitted. Accordingly, the UE or nodes supported by the LTE-MTC service may determine whether the cell found through the cell search is a cell supporting the LTE-MTC service or not, and when the cell also supports the LTE-MTC service, may acquire the position of the resource in which the corresponding SIB may be received. In addition, the UE supported by the legacy LTE service may receive the LTE service supported without an additional operation or a new operation, further to the existing operation.

A UE supporting the LTE-MTC service (i.e., an MTC UE) may perform a random access procedure based on the received various pieces of system information. Additionally, step 701 of the random access procedure described in connection with FIG. 7, the MTC UE determines a coverage enhancement level (CE-level) before transmitting a random access preamble (hereinafter, interchangeably used with physical random access channel (PRACH), PRACH preamble, or preamble).

As in the description of the LTE-MTC service, the MTC UE may repeatedly transmit the random access preamble several times so that the UEs at the cell edge may also succeed in random access so as to increase coverage. However, since the UEs in the cell center do not need to repeatedly transmit the random access preamble, multiple CE levels may be configured so that the number of repetitions of the random access preamble applied to each MTC UE, the time resource, the frequency resource, and the preamble sequence resources may be configured differently according to each CE level.

In order to reduce complexity of RedCap UEs, according to an embodiment of the disclosure, a half-duplex operation (or half-duplex communication) for operating without a duplexer in a frequency division duplex (FDD) or time division duplex (TDD) system may be considered. Therefore, a communication method in which a RedCap UE performs a half-duplex operation in an FDD or TDD system is required. According to an embodiment of the disclosure, a method is provided for a cell or a base station to recognize a RedCap UE during an initial access process of the RedCap UE (or half-duplex communication UE).

In initial cell access to a cell (or base station), the RedCap UE obtains cell synchronization by receiving a synchronization block, e.g., as described above in connection with FIG. 4 or 5, and then determines whether the cell supports the RedCap UE by obtaining an MIB or SIB or via a random access procedure. When determining that the cell supports the RedCap UE, the RedCap UE may notify the base station that the UE attempting access is a RedCap UE by transmitting, to the base station, through message 1 or message 3, capability information including at least one or more of the bandwidth size supported by the RedCap UE in the cell, whether half-duplex operation or full-duplex operation is supported, and the number of transmission or reception antennas equipped (or supported). Thereafter, the RedCap UE may finish the random access procedure and proceed to an RRC connected mode for transmitting/receiving data to/from the cell.

The base station may transmit a configuration for allowing transmission of the capability information using the message 1 or message 3 to the RedCap UE through MIB or SIB1 and, when the RedCap UE receives a configuration for transmission of the capability information through the MIB or SIB1, the base station may transmit the capability information using the message 1 or message 3.

The RedCap UE may support half-duplex communication or full-duplex communication. Accordingly, the RedCap UE may report whether half-duplex communication or full-duplex communication is supported to the base station through a capability report, and after the report, the base station may configure for the RedCap UE whether the RedCap UE may perform transmission/reception using half-duplex communication or full-duplex communication.

When the UE reports the capability for the half-duplex communication to the base station, since there is generally no duplexer, a switching gap for switching radio frequency (RF) between transmission and reception may be required when operating in FDD or TDD. The switching gap is a value determined based on a value shown in the table below, and may be included in the standard. For example, in Table 5 below, switching time required when switching RF from UL transmission to DL reception based on frequency range 1 (FR1) is given as $N_{TX-Rx}=25600$, and the switching gap is $25600 \times Tc$. Here, $T_c=1/(\Delta f_{max} \cdot N_f)$, $\Delta f_{max}=480 \cdot 10^3$ IIx, and $Nf=4096$.

Table 5 below shows RF switching times in FR1 and frequency range 2(FR2). The switching time required when receiving RF from DL reception to UL transmission based on FR1 is given as $N_{Rx-Tx}=25600$, and the switching gap is $25600 \times Tc$.

TABLE 5

| Transition time | FR1 | FR2 |
|---|---|---|
| $N_{Tx-RX}$ | 25600 | 13792 |
| $N_{Rx-TX}$ | 25600 | 13792 |

Hereinafter, a method of allocating time domain resources for a data channel in a 5G communication system will be described. The base station may configure, in the UE, a time domain resource allocation information table for a PDSCH and a PUSCH via higher layer signaling (e.g., RRC signaling).

The base station may configure a table configured by maxNrofDL-Allocations=17 entries for the PDSCH, and may configure a table configured by maxNrofUL-Allocations=17 entries for the PUSCH. The time domain resource allocation information may include, e.g., PDCCH-to-PDSCH slot timing (corresponding to a time interval in units of slots between when a time point at which PDCCH is received and a time point at which a PDSCH scheduled by the received PDCCH is transmitted, and denoted by K0), PDCCH-to-PUSCH slot timing (corresponding to a time interval in units of slots between a time point at which the PDCCH is received and a time point at which the PUSCH scheduled by the received PDCCH is transmitted, and denoted by K2), information on the location and length of a start symbol in which the PDSCH or PUSCH is scheduled within a slot, PDSCH or PUSCH mapping type, etc. For example, time domain resource allocation information for the PDSCH may be configured in the UE through an RRC signal as shown in Table 6 below.

TABLE 6

| PDSCH-TimeDomainResourceAllocationList information element |
|---|
| PDSCH-TimeDomainResourceAllocationList    ::=    SEQUENCE (SIZE(1..maxNrofDL-Allocations))    OF    PDSCH-TimeDomainResourceAllocation<br>PDSCH-TimeDomainResourceAllocation ::=    SEQUENCE {<br>    k0    INTEGER(0..32)<br>OPTIONAL,  -- Need S<br>    (PDCCH-to-PDSCH timing, in units of slot)<br>    mappingType    ENUMERATED {typeA, typeB},<br>    (PDSCH mapping type)<br>    startSymbolAndLength    INTEGER (0..127)<br>    (Start symbol and length of PDSCH)<br>} |

In addition, time domain resource allocation information for PUSCH may be configured to the UE through an RRC signal as shown in Table 7 below.

TABLE 7

| PUSCH-TimeDomainResourceAllocation information element |
|---|
| PUSCH-TimeDomainResourceAllocationList ::=    SEQUENCE (SIZE(1..maxNrofUL-Allocations))    OF    PUSCH-TimeDomainResourceAllocation<br>PUSCH-TimeDomainResourceAllocation ::=    SEQUENCE {<br>    k2    INTEGER(0..32)<br>OPTIONAL,  -- Need S |

TABLE 7-continued

PUSCH-TimeDomainResourceAllocation information element

```
    (PDCCH-to-PUSCH timing, in units of slot)
    mappingType                        ENUMERATED {typeA,
typeB},
    (PUSCH mapping type)
    startSymbolAndLength               INTEGER (0..127)
    (start symbol and length of PUSCH)
}
```

The base station may indicate one of entries of table for the time domain resource allocation information to the UE via layer 1 (L1) signaling (e.g., DCI) (e.g., indication may be performed using the 'time domain resource allocation' field in DCI). The UE may acquire time domain resource allocation information for the PDSCH or PUSCH based on the DCI received from the base station.

The UE may consider a combination of the start symbol and length of the PUSCH in Table 8 as effective PUSCH time domain resource allocation. Table 8 shows combinations of start symbols and lengths of effective PUSCHs according to PUSCH mapping types and cyclic prefixes (CPs).

TABLE 8

| PUSCH mapping type | Normal cyclic prefix | | | Extended cyclic prefix | | |
|---|---|---|---|---|---|---|
| | S | L | S + L | S | L | S + L |
| Type A (repetition Type A only) | 0 | {4, ..., 14} | {4, ..., 14} | 0 | {4, ..., 12} | {4, ..., 12} |
| Type B | {0, ..., 13} | {1, ..., 14} | {1, ..., 14} for repetition Type A, {1, ..., 27} for repetition Type B | {0, ..., 11} | {1, ..., 12} | {1, ..., 12} for repetition Type A, {1, ..., 23} for repetition Type B |

For example, the symbol length (L) of PUSCH in one slot in PUSCH repetition type A is 4 or more and less than 14, and the nominal PUSCH symbol length (L) in one slot in PUSCH repetition type B is greater than or equal to 1 and less than 14.

In the following, transmission of a PUSCH in a 5G system will be described in detail. The PUSCH transmission may be dynamically scheduled by a UL grant in DC or operated by configured grant Type 1 or Type 2. Dynamic scheduling for the PUSCH transmission may be indicated by, e.g., DCI format 0_0 or 0_1.

A configured grant Type 1 PUSCH transmission may be semi-statically configured to operate upon reception of configuredGrantConfig including rrc-ConfiguredUplinkGrant of Table 9, via higher layer signaling, without receiving the UL grant in DCI. A configured grant Type 2 PUSCH transmission may be semi-persistently scheduled by a UL grant in DCI after receiving configuredGrantConfig not including rrc-ConfiguredUplinkGrant in Table 9, via higher layer signaling. When a PUSCH transmission is operated by a configured grant, parameters applied to a PUSCH transmission may be applied through configuredGrantConfig, which is higher layer signaling of Table 9, except for specific parameters provided by push-Config of Table 10, which is higher layer signaling (e.g., dataScramblingIdentityPUSCH, txConfig, codebookSubset, maxRank, scaling of UCI-On-PUSCH, etc.). For example, if the UE is provided with transformPrecoder in configuredGrantConfig, which is higher layer signaling of Table 9, the UE may apply tp-pi2BPSK in push-Config of Table 10 to PUSCH transmission operated by the configured grant.

For Configured grant Type 1 or Type 2 PUSCH transmission, the number of repetitions K (applied to a transport block) may be provided based on the above information if numberOfRepetitions is included in the entries of table for time domain resource allocation information, or otherwise may be provided based on repK in configuredGrantConfig. In addition, for Configured grant Type 1 or Type 2 PUSCH transmission, the number of slots N applied for (determination of transport block size (TBS)) may be provided based on the above information, if numberOfSlotsTBoMS is included in the entries of the table for time domain resource allocation information, or otherwise may be provided by a higher layer signal in configuredGrantConfig.

In addition, whether to perform a PUSCH repetition type A or a PUSCH repetition type B is configured through pusch-RepTypeindicator-r16 in configuredGrangConfig, which is higher layer signaling of Table 9. That is, when the UE receives the pushch-RepTypeA configuration, the UE may perform PUSCH repetition type A, and when the UE receives the pusch-RepTypeB configuration, the UE may perform PUSCH repetition type B. The UE may obtain transmission start SFN information of PUSCH repetition type A or B through timeReferenceSFN-r16 in configuredGrangConfig, which is the higher layer signaling of Table 9, and may obtain a transmission start slot of PUSCH repetition type A or B via timeDomainOffset within the SFN.

TABLE 9

| ConfiguredGrantConfig |
| --- |

```
ConfiguredGrantConfig ::=         SEQUENCE {
    frequencyHopping              ENUMERATED {intraSlot,
interSlot}                        OPTIONAL,    --
Need S,
    cg-DMRS-Configuration         DMRS-Uplink Config,
    mcs-Table                     ENUMERATED  {qam256,
qam64LowSE}                       OPTIONAL,
-- Need S
    mcs-TableTransformPrecoder    ENUMERATED  {qam256,
qam64LowSE}                       OPTIONAL,
-- Need S
    uci-OnPUSCH                   SetupRelease { CG-UCI-
OnPUSCH }                         OPTIONAL,
-- Need M
    resourceAllocation                      ENUMERATED
{ resourceAllocationType0, resourceAllocationType1, dynamicSwitch },
    rbg-Size                      ENUMERATED {config2}
OPTIONAL,       -- Need S
    powerControlLoopToUse         ENUMERATED {n0, n1},
    p0-PUSCH-Alpha                P0-PUSCH-AlphaSetId,
    transformPrecoder             ENUMERATED {enabled,
disabled}                         OPTIONAL,    --
Need S
    nrofHARQ-Processes            INTEGER(1..17),
    repK                          ENUMERATED {n1, n2, n4,
n8},
    repK-RV                       ENUMERATED {s1-0231, s2-
0303, s3-0000}                    OPTIONAL,    --
Need R
    periodicity                   ENUMERATED {
                                       sym2,    sym7,
sym1x14, sym2x14, sym4x14, sym5x14, sym8x14, sym10x14, sym17x14,
sym20x14,
                                                sym32x14,
sym40x14, sym64x14, sym80x14, sym128x14, sym170x14, sym256x14,
sym320x14, sym512x14,
                                                sym640x14,
sym1024x14, sym1280x14, sym2560x14, sym5120x14,
                                       sym6,    sym1x12,
sym2x12, sym4x12, sym5x12, sym8x12, sym10x12, sym17x12, sym20x12,
sym32x12,
                                                sym40x12,
sym64x12, sym80x12, sym128x12, sym170x12, sym256x12, sym320x12,
sym512x12, sym640x12,
                                                sym1280x12,
sym2560x12
                                  },
    configuredGrantTimer          INTEGER (1..64)
OPTIONAL,    -- Need R
    rrc-ConfiguredUplinkGrant     SEQUENCE {
        timeDomainOffset              INTEGER (0..5119),
        timeDomainAllocation          INTEGER (0..16),
        frequencyDomainAllocation            BIT STRING
(SIZE(18)),
        antennaPort                   INTEGER (0..31),
        dmrs-SeqInitialization        INTEGER   (0..1)
OPTIONAL,    -- Need R
        precodingAndNumberOfLayers    INTEGER (0..63),
        srs-ResourceIndicator         INTEGER   (0..16)
OPTIONAL,       -- Need R
        mcsAndTBS                     INTEGER (0..31),
        frequencyHoppingOffset        INTEGER   (1..
maxNrofPhysicalResourceBlocks-1)  OPTIONAL,    --
Need R
        pathlossReferenceIndex                  INTEGER
(0..maxNrofPUSCH-PathlossReferenceRSs-1),
        pusch-RepTypeIndicator-r16    ENUMERATED   {pusch-RepTypeA,
pusch-RepTypeB}    OPTIONAL,         -- NeedM
frequencyHoppingPUSCH-RepTypeB-r16    ENUMERATED      {interRepetition,
interSlot} OPTIONAL, -- Cond RepTypeB
timeReferenceSFN-r16 ENUMERATED {sfn512} OPTIONAL -- Need S
        ...
    }
OPTIONAL,       -- Need R
    ...
}
```

A DMRS antenna port for a PUSCH transmission may be the same as an antenna port for a sounding reference signal (SRS) transmission. A PUSCH transmission may follow a codebook-based transmission method and a non-codebook-based transmission method, respectively, depending on whether the value of txConfig in push-Config of Table 7, which is a higher layer signaling, is 'codebook' or 'non-Codebook'. As described above, a PUSCH transmission may be dynamically scheduled through DCI format 0_0 or 0_1, and may be semi-statically configured by a configured grant.

If the UE is instructed to schedule PUSCH transmission through DCI format 0_0, the UE may perform beam configuration for PUSCH transmission using pucch-spatialRelationInfoID corresponding to a UE-specific (dedicated) PUCCH resource having a lowest ID within a UL BWP activated in a serving cell. In this case, a PUSCH transmission may be performed based on a single antenna port. The UE may be configured not to expect scheduling for PUSCH transmission through DCI format 0_0 in a BWP in which a PUCCH resource including pucch-spatialRelationInfo is not configured. If the UE is not configured with txConfig in push-Config of Table 10, the UE may be configured not to expect scheduling in DCI format 0_1.

book-based PUSCH DCI format 0_1 or semi-statically configured by configured grant, the UE may determine a precoder for PUSCH transmission based on an SRS resource indicator (SRI), a transmission precoding matrix indicator (TPMI), and a transmission rank (e.g., a number of PUSCH transmission layers).

The SRI may be given through a field SRS resource indicator in DCI or configured through srs-ResourceIndicator which is higher layer signaling. The UE may receive at least one SRS resource configured upon transmission of codebook-based PUSCH, and for example, up to two. When a UE receives the SRI through DCI, an SRS resource indicated by the corresponding SRI may imply an SRS resource corresponding to the SRI among SRS resources transmitted prior to the PDCCH including the SRI. In addition, TPMI and transmission rank may be given through a field precoding information and number of layers in DCI or configured through precodingAndNumberOfLayers, which is a higher layer signaling. TPMI may be used to indicate a precoder applied to PUSCH transmission.

A precoder to be used for PUSCH transmission may be selected from a UL codebook having the same number of antenna ports as the value of nrofSRS-Ports in SRS-Config, which is higher layer signaling. In a codebook-based

TABLE 10

PUSCH-Config

```
PUSCH-Config ::=                        SEQUENCE {
    dataScramblingIdentityPUSCH               INTEGER (0..1023)
OPTIONAL,    -- Need S
    txConfig                                  ENUMERATED
{codebook, nonCodebook}     OPTIONAL,   -- Need S
    dmrs-UplinkForPUSCH-MappingTypeA       SetupRelease { DMRS-
UplinkConfig } OPTIONAL,      -- Need M
    dmrs-UplinkForPUSCH-MappingTypeB       Setup Release { DMRS-
UplinkConfig }   OPTIONAL,    -- Need M
    pusch-PowerControl                        PUSCH-PowerControl
OPTIONAL,      -- Need M
    frequencyHopping                          ENUMERATED
{intraSlot, interSlot}       OPTIONAL,    -- Need S
    frequencyHoppingOffsetLists     SEQUENCE (SIZE (1..4)) OF INTEGER
(1..                              maxNrofPhysicalResourceBlocks-1)
OPTIONAL,        -- Need M
    resourceAllocation                        ENUMERATED
{ resourceAllocationType0, resourceAllocationType1, dynamicSwitch},
    pusch-TimeDomainAllocationList         SetupRelease { PUSCH-
TimeDomainResourceAllocationList }    OPTIONAL,    -- Need M
    pusch-AggregationFactor    ENUMERATED    {  n2,   n4,   n8  }
OPTIONAL,     -- Need S
    mcs-Table              ENUMERATED {qam256, qam64LowSE}
OPTIONAL,      -- Need S
    mcs-TableTransformPrecoder  ENUMERATED {qam256, qam64LowSE}
OPTIONAL,       -- Need S
    transformPrecoder              ENUMERATED {enabled, disabled}
OPTIONAL,        -- Need S
    codebookSubset     ENUMERATED    {fullyAndPartialAndNonCoherent,
partialAndNonCoherent,nonCoherent}
                OPTIONAL, -- Cond codebookBased
    maxRank                                INTEGER (1..4)
OPTIONAL, -- Cond codebookBased
    rbg-Size                           ENUMERATED { config2}
OPTIONAL, -- Need S
    uci-OnPUSCH                             SetupRelease { UCI-
OnPUSCH}     OPTIONAL, -- Need M
    tp-pi2BPSK                                ENUMERATED
{enabled}              OPTIONAL, -- Need S
    ...
}
```

A codebook-based PUSCH transmission may be dynamically scheduled through DCI format 0_0 or 0_1, and may operate semi-statically by configured grant. When the PUSCH transmission is dynamically scheduled by code- PUSCH transmission, a UE may determine a codebook subset based on TPMI and codebookSubset in push-Config, which is higher layer signaling. In this case, codebookSubset in push-Config, which is higher layer signaling, may be configured to be one of 'fullyAndPartialAndNonCoherent', 'partialAndNonCoherent', or 'nonCoherent' based on the UE capability reported by the UE to the base station.

If the UE has reported 'partialAndNonCoherent' using the UE capability, the UE may be configured not to expect the value of codebookSubset, which is higher layer signaling, to be configured as 'fullyAndPartialAndNonCoherent'. In addition, if the UE has reported 'nonCoherent' using the UE capability, the UE may be configured not to expect the value of codebookSubset, which is higher layer signaling, to be configured as 'fullyAndPartialAndNonCoherent' or 'partialAndNonCoherent'. When nrofSRS-Ports in SRS-ResourceSet, which is higher layer signaling, indicate two SRS antenna ports, the UE may be configured not to expect that the value of codebookSubset, which is higher layer signaling, is configured as 'partialAndNonCoherent'.

The UE may receive an SRS resource configured in which the value of usage in the SRS-ResourceSet, which is higher layer signaling, is configured as 'codebook', and an SRS resource in the corresponding SRS resource set may be indicated through SRI. If several SRS resources are configured in an SRS resource set in which the usage value in SRS-ResourceSet, which is higher layer signaling, is configured as 'codebook', the UE may be configured to expect the value of nrofSRS-Ports in SRS-Resource, which is higher layer signaling, to have the same value for all SRS resources.

The UE may transmit one or multiple SRS resources included in the SRS resource set in which the value of usage is configured as 'codebook' to the base station according to higher layer signaling, and the base station may select one of the SRS resources transmitted by the UE and instruct the UE to perform PUSCH transmission using transmission beam information of the corresponding SRS resource. In this case, in codebook-based PUSCH transmission, SRI is used as information for selecting an index of one SRS resource and may be included in DCI. Additionally, the base station may include information indicating the TPMI and rank to be used by the UE for PUSCH transmission in the DCI and transmit the same. The UE may perform PUSCH transmission, using the SRS resource indicated by the SRI, by applying a precoder indicated by the TPMI and rank indicated based on the transmission beam of the corresponding SRS resource. A non-codebook based PUSCH transmission may be dynamically scheduled through DCI format 0_0 or 0_1, or may operate semi-statically by configured grant.

When at least one SRS resource is configured in the SRS resource set in which the value of usage in the SRS-ResourceSet, which is higher layer signaling, is configured as 'nonCodebook', the UE may receive non-codebook based PUSCH transmission scheduling through DCI format 0_1.

With regard to an SRS resource set in which the value of usage in the SRS-ResourceSet, which is higher layer signaling, is configured as 'nonCodebook', the UE may receive a non-zero power (NZP) channel state information (CSI)-reference signal(RS) resource configured in association with one SRS resource set. The UE may calculate a precoder for SRS transmission through measurement of NZP CSI-RS resource configured in association with the SRS resource set. If a difference between the last received symbol of an aperiodic NZP CSI-RS resource associated with the SRS resource set and the first symbol of aperiodic SRS transmission in the UE is less than a specific symbol (e.g., 42 symbols), the UE may be configured not to expect information about the precoder for an SRS transmission to be updated.

When the value of resourceType in SRS-ResourceSet, which is higher layer signaling, is configured as 'aperiodic', the NZP CSI-RS associated with the SRS-ResourceSet may be indicated by SRS request, which is a field in DCI format 0_1 or 1_1. In this case, if the NZP CSI-RS resource associated with the SRS-ResourceSet is an aperiodic NZP CSI resource and the value of the field SRS request in DCI format 0_1 or 1_1 is not '00', it may indicate that the NZP CSI-RS associated with the SRS-ResourceSet exists. The corresponding DCI should not indicate cross carrier or cross BWP scheduling. In addition, if the value of the SRS request indicates the existence of the NZP CSI-RS, the corresponding NZP CSI-RS may be located in a slot in which the PDCCH including the SRS request field is transmitted. In this case, TCI states configured for the scheduled subcarriers may not be configured as QCL-TypeD.

If a periodic or semi-persistent SRS resource set is configured, the NZP CSI-RS associated with the SRS resource set may be indicated through associated CSI-RS in the SRS-ResourceSet, which is higher layer signaling. In connection with non-codebook based transmission, the UE may be configured not to expect spatialRelationInfo, which is higher layer signaling for SRS resource, and associatedCSI-RS in SRS-ResourceSet, which is higher layer signaling, to be configured together.

When receiving a plurality of SRS resources configured, the UE may determine the precoder and transmission rank, which are to be applied to PUSCH transmission, based on an SRI indicated by the base station. In this case, the SRI may be indicated through a field SRS resource indicator in DCI or configured through srs-ResourceIndicator, which is higher layer signaling. Similar to the above-described codebook-based PUSCH transmission, when a UE is provided with the SRI through the DCI, the SRS resource indicated by the corresponding SRI may imply an SRS resource corresponding to the SRI among SRS resources transmitted prior to the PDCCH including the SRI. The UE may use one or multiple SRS resources for SRS transmission, and the maximum number of SRS resources and the maximum number of SRS resources that can be simultaneously transmitted through the same symbol within one SRS resource set may be determined by a UE capability reported by the UE to the base station. In this case, SRS resources transmitted simultaneously by the UE may occupy the same RB. The UE may configure one SRS port for each SRS resource. Only one SRS resource set in which the value of usage in the SRS-ResourceSet, which is higher layer signaling, is configured as 'nonCodebook' may be configured, and up to four SRS resources for non-codebook based PUSCH transmission may be configured.

The base station transmits one NZP CSI-RS associated with the SRS resource set to the UE, and the UE may calculate a precoder to be used for transmission of one or multiple SRS resources in the corresponding SRS resource set based on a measurement result when receiving the corresponding NZP CSI-RS. The UE may apply the calculated precoder during transmission of one or multiple SRS resources in the SRS resource set, in which the usage is configured as 'nonCodebook', to the base station, and the base station may select one or multiple SRS resources among the received one or multiple SRS resources. In this case, in a non-codebook based PUSCH transmission, an SRI indicates an index capable of expressing a combination of one or multiple SRS resources, and the SRI may be included in DCI. Here, the number of SRS resources indicated by the SRI transmitted by the base station may correspond to the number of transmission layers of the PUSCH, and the UE may transmit the PUSCH by applying the precoder, having been applied for transmission of the SRS resource, to each layer.

Hereinafter, repetition transmission of a UL data channel (e.g., a PUSCH) in a 5G system will be described in detail. In the 5G system, two types, e.g., a PUSCH repetition type A and a PUSCH repetition type B, may be supported as a method for repetition transmission of a UL data channel. The UE may be configured with either PUSCH repetition type A or B through higher layer signaling.

PUSCH Repetition Type A

As described above, the start symbol and length of a UL data channel in one slot may be determined by the time domain resource allocation method, and the base station may transmit the number of repetition transmissions to the UE via higher layer signaling (e.g., RRC signaling) or L1 signaling (e.g., DCI).

The UE may repeatedly transmit a UL data channel having the same start symbol and length as those of the UL data channel configured above, in consecutive slots based on the number of repeated transmissions received from the base station. In this case, when at least one symbol among the symbols in a slot configured for DL by the base station to the UE or in a slot for the UL data channel repetition transmission configured by the UE is configured for DL, e.g., the at least one symbol is configured for DL by tdd-UL-DL-ConfigurationCommon or tdd-UL-DL-ConfigurationDedicated, the UE may skip UL data channel transmission in the corresponding slot. Since transmission may not occur, although it is included in the number of repetitions of UL data channel transmission, the actual number of repeated transmissions may be smaller than the number of repetitions configured by the base station.

On the other hand, a UE supporting Rel-17 UL data repetition transmission (i.e., a UE reporting the capability of supporting Rel-17 UL data repetition transmission to a base station through a higher layer signal) may be configured to determine a slot, in which UL data repetition transmission is possible, as an available slot (or N×K slots as slots for performing UL data repetition transmission), and to count the number of transmissions at the time of UL data channel repetition transmission in a slot determined as an available slot. If the UL data channel repetition transmission in a slot determined as an available slot is skipped, the UL data channel transmission may be repeatedly performed through a slot transmittable after postpone. Alternatively, upon receiving the report on the capability of supporting Rel-17 UL data repetition transmission from a UE supporting Rel-17 UL data repetition transmission (i.e., a UE reporting the capability of supporting Rel-17 UL data repetition transmission to a base station through a higher layer signal), the base station may transmit configuration information related to Rel-17 UL data repetition transmission, such as AvailableSlotCounting, to the UE through a higher layer signal.

When AvailableSlotCounting is enabled in the configuration information, and at least one symbol among the symbols in a slot configured for DL by the base station to the UE or in a slot for the UL data channel repetition transmission configured by the UE is configured for DL, e.g., the at least one symbol is configured for DL by tdd-UL-DL-ConfigurationCommon or tdd-UL-DL-ConfigurationDedicated, the UE is configured not to include the slot as the available slot, and determine the remaining non-consecutive slots as the available slot (or N×K slots for performing the UL data repetition transmission), and perform the UL data channel repetition transmission in the slot determined as the available slot.

PUSCH Repetition Type B

As described above, the start symbol and length of a UL data channel in one slot may be determined by the time domain resource allocation method, and the base station may transmit the number of repetition transmission, numberofpetitions, through higher layer signaling (e.g., RRC signaling) or L1 signaling (e.g., DCI) to the UE.

First, nominal repetition of the UL data channel may be determined as follows, based on the start symbol and length of the UL data channel configured above. Here, the nominal repetition may imply a resource of a symbol configured by the base station for PUSCH repetition transmission, and the UE may determine resources usable for UL in the configured nominal repetition. In this case, a slot in which the nth nominal repetition starts may be given by $$K_S + \left\lfloor \frac{S + n \cdot L}{N_{symb}^{slot}} \right\rfloor,$$

and a symbol where the nominal repetition starts in the start slot may be given by $\mathrm{mod}(S+n\cdot L, N_{symb}^{slot})$. A slot in which the nth nominal repetition ends may be given by $$K_S + \left\lfloor \frac{S + (n+1) \cdot L - 1}{N_{symb}^{slot}} \right\rfloor,$$

and a symbol where the nominal repetition ends in the last slot may be given by $\mathrm{mod}(S+(n+1)\cdot L-1, N_{symb}^{slot})$. Here, n=0, . . . , numberofpepetitions−1, S represents the start symbol of the configured UL data channel, and L may represent the symbol length of the configured UL data channel. $K_s$ indicates a slot in which PUSCH transmission starts, and $N_{symb}^{slot}$ may indicate the number of symbols per slot.

The UE may determine an invalid symbol for PUSCH repetition type B. A symbol configured for DL by tdd-UL-DL-ConfigurationCommon or tdd-UL-DL-ConfigurationDedicated may be determined as an invalid symbol for PUSCH repetition type B. Additionally, an invalid symbol may be configured based on a higher layer parameter (e.g., InvalidSymbolPattern). For example, the invalid symbol may be configured by providing a symbol level bitmap over one slot or two slots by the higher layer parameter (e.g., InvalidSymbolPattern). In this case, "1" in the bitmap may indicate an invalid symbol. Additionally, the period and pattern of the bitmap may be configured through a higher layer parameter (e.g., periodicityAndPattern). If a higher layer parameter (e.g., InvalidSymbolPattern) is configured and the InvalidSymbolPatternIndicator-ForIDCI-Format0_1 or InvalidSymbolPatternIndicator-ForDCI-Format0_2 parameter indicates 1, the UE applies the invalid symbol pattern, and if the parameter indicates 0, the invalid symbol pattern may not be applied. Alternatively, if a higher layer parameter (e.g., InvalidSymbolPattern) is configured and the InvalidSymbolPatternIndicator-ForDCIFormat0_1 or InvalidSymbolPatternIndicator-ForDCIFormat0_2 parameter is not configured, the UE may apply an invalid symbol pattern.

After invalid symbols are determined in each nominal repetition, the UE may consider symbols excluding the determined invalid symbols as valid symbols. If one or more valid symbols are included in each nominal repetition, the nominal repetition may include one or more actual repetitions. Here, each actual repetition may imply a symbol actually used for PUSCH repetition transmission among the symbols configured by the configured nominal repetition, and may include a continuous set of valid symbols that may be used for PUSCH repetition type B within one slot. The UE may skip actual repetition transmission when actual repetition having one symbol is configured as valid, except for a case in which the symbol length of the UL data channel configured is L=1. A redundancy version may be applied according to a redundancy version pattern configured for each nth actual repetition.

Table 11 shows a redundancy version pattern that may be configured for each n-th actual repetition of PUSCH repetition type B or each n-th transmission occasion for actual transmission (i.e., including only transmission in available slots) for PUSCH repetition type A.

TABLE 11

| rv$_{id}$ indicated by the DCI scheduling the PUSCH | rv$_{id}$ to be applied to n$^{th}$ transmission occasion (repetition Type A) or n$^{th}$ actual repetition (repetition Type B) | | | |
|---|---|---|---|---|
| | n mod 4 = 0 | n mod 4 = 1 | n mod 4 = 2 | n mod 4 = 3 |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

Unless otherwise specified, the UE may be referred to as a RedCap UE supporting half-duplex communication described below. In addition, the RedCap UE may support Rel-17 UL data repetition transmission, and may transmit a report on the capability of supporting Rel-17 UL data repetition transmission to the base station through a higher layer signal. Embodiments of the disclosure may also be applied to RedCap UEs having the capability.

Embodiments considering a RedCap UE supporting half-duplex communication will be described below, and the RedCap UE supporting half-duplex communication may be simply referred to as a RedCap UE.

Figure 8A:
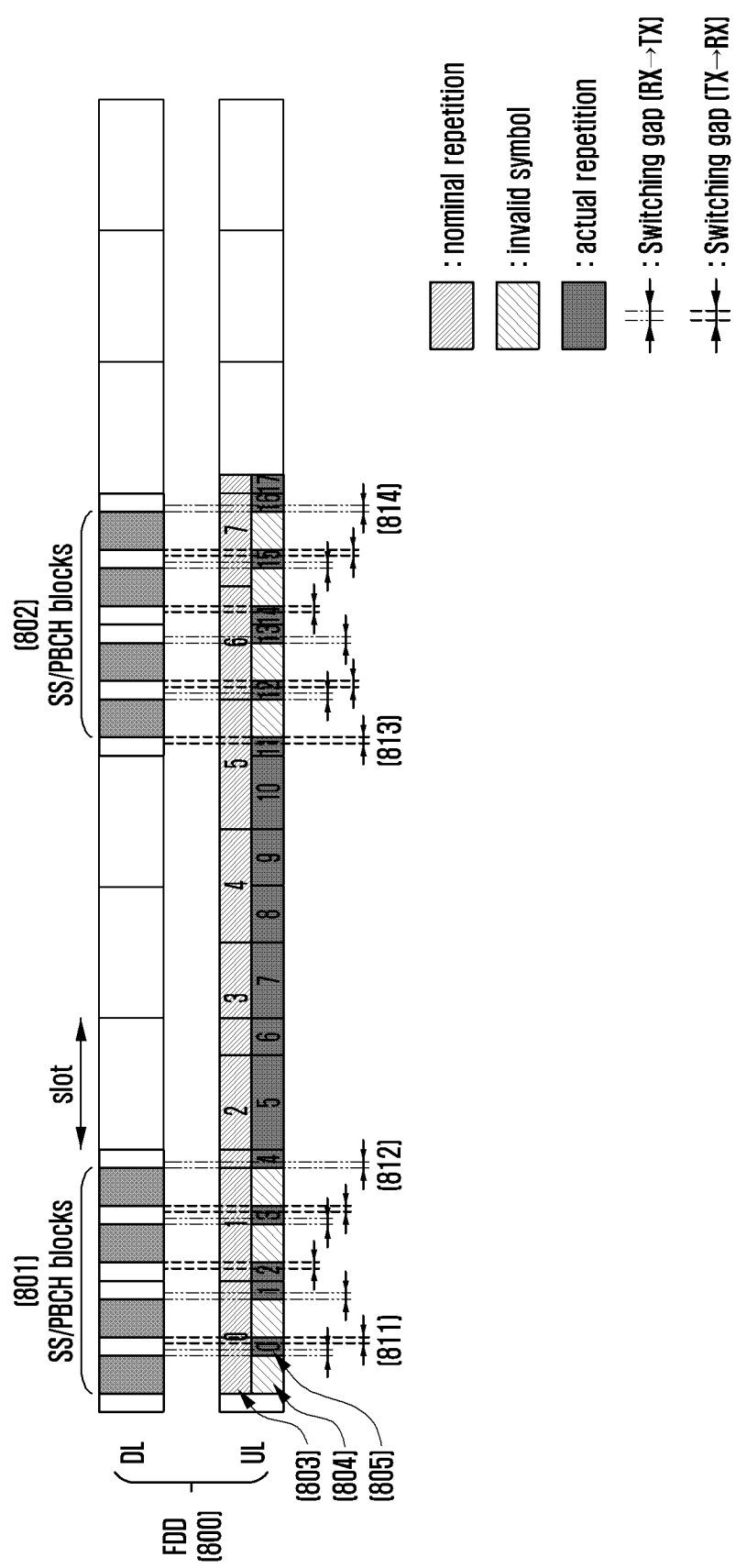
FIG. 8A illustrates SSB reception and PUSCH repetition type B transmission by a RedCap UE simultaneously occurring in a wireless communication system according to an embodiment.
Figure 8B:
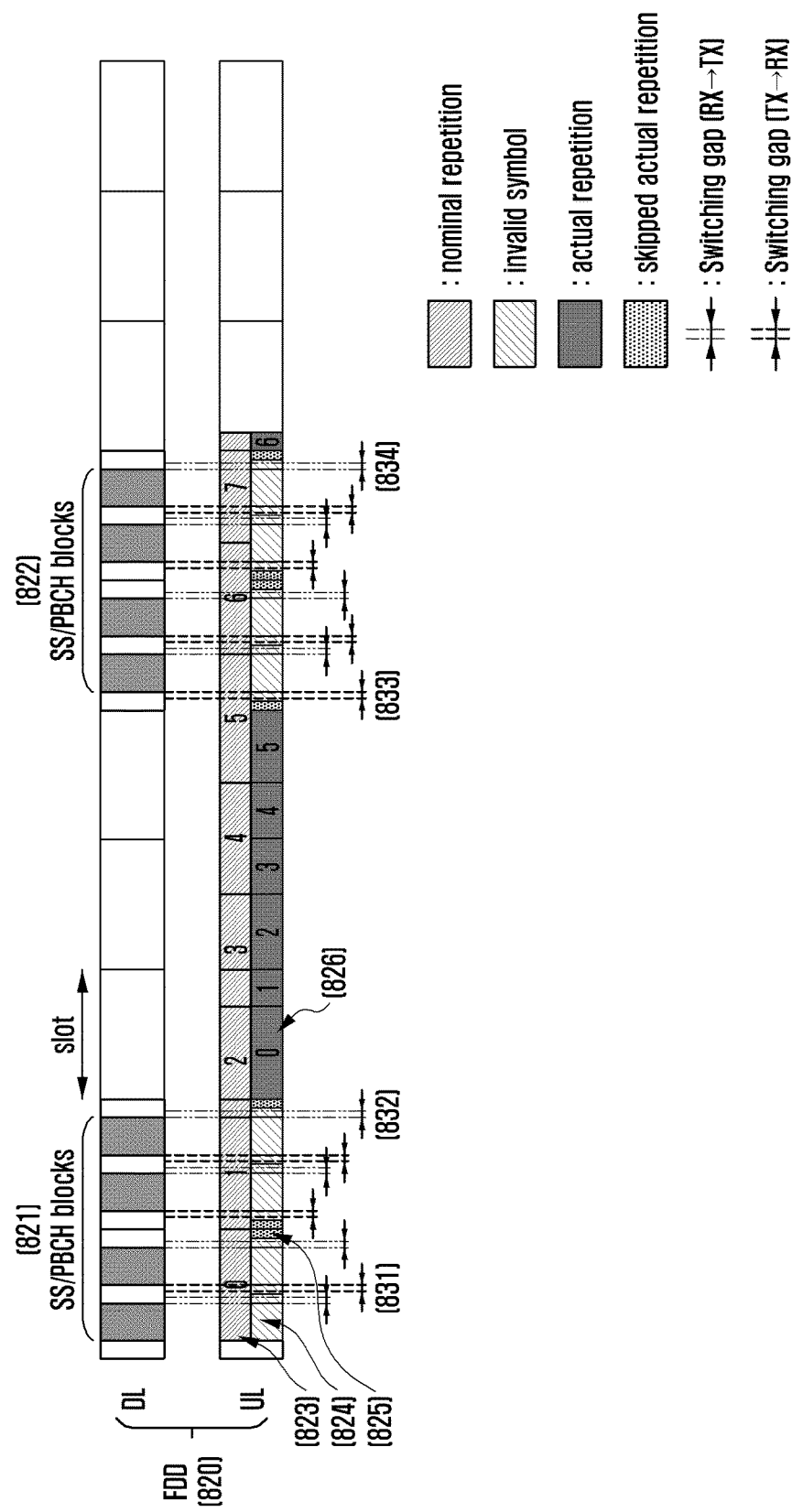
FIG. 8B illustrates SSB reception and PUSCH repetition type B transmission by a RedCap UE simultaneously occurring in a wireless communication system to which the disclosure is according to an embodiment.

FIG. 8A illustrates SSB reception and PUSCH repetition type B transmission by a RedCap UE simultaneously occurring in a wireless communication system according to an embodiment. FIG. 8B illustrates SSB reception and PUSCH repetition type B transmission by a RedCap UE simultaneously occurring in a wireless communication system to which the disclosure is according to an embodiment.

Referring to FIGS. 8A and 8B, a method for solving a case in which SSB reception and PUSCH repetition type B transmission by a RedCap UE occur at the same time and collide in the time domain, or a case in which even if the reception and transmission do not actually collide in the time domain, when PUSCH repetition type B transmission is performed within the above described RF switching gap right before or right after the SSB will be described. In FIGS. 8A and 8B, although only a situation in which the SSB and the PUSCH repetition type B collide in the time domain is considered, CORESET #0 configured in MIB or SIB1 may be applied, instead of the SSB, as a cell-specific configured DL, and repeated UL reference signals such as SRS may be applied, instead of the PUSCH repetition type B, as a UL channel/signal configured by a higher layer signal (e.g., an RRC dedicated configured UL).

Referring to FIG. 8A, an FDD 800 assumes a case of reporting a capability signal indicating that a RedCap UE supports half-duplex communication or a case in which although reporting of a capability signal indicating that the RedCap UE supports full-duplex communication (or does not support half-duplex communication) is performed, transmission/reception of the capability signal using half-duplex communication is configured from a base station. In the FDD 800, an example in which PUSCH repetition type B transmission is performed without considering an RF switching interval from UL to DL or from DL to UL of the RedCap UE is shown, in case that reception of an SSB, which is defined in the standard or configured by system information or a higher layer signal, and PUSCH repetition type B transmission, the transmission of which is configured in a specific resource (frequency, time, etc.) by a higher layer signal in advance or scheduled by a DL control channel (e.g., a PDCCH) occur simultaneously in a specific time interval.

In the FDD 800, the RedCap UE may detect an SSB 801 or 802 as defined in the standard upon initial access. Thereafter, the RedCap UE may be configured to determine that the SSB 801 or 802 is received through a specific resource, such as a specific frequency (or specific RBs) and a specific time (or a specific slot or symbols), according to time and frequency resources defined in standards or configured by system information or a higher layer signal.

In addition, the RedCap UE may determine nominal repetition 803 when PUSCH repetition type B is indicated to be performed in a specific resource by a previously configured higher layer signal or by a DL control channel.

In FIG. 8A, the nominal repetition 803 is shown as an example of a start slot of the PUSCH repetition type B coinciding with a transmission slot of the SSB 801, and the start symbol of the PUSCH repetition type B in a slot corresponds to the 3rd symbol and has a length of 12 symbols, and the number of repetitions thereof is configured as 8.

In addition, the RedCap UE may determine an invalid symbol for the PUSCH repetition type B transmission. In addition to the previously described invalid symbol determination method, the RedCap UE may determine an invalid symbol when transmission of the SSB 801 or 802 overlaps in a time resource according to time and frequency resources configured by the system information or higher layer signal, and this invalid symbol is shown as reference numeral 804.

Actual repetition 805 of PUSCH repetition type B transmission is performed in the remaining area except for the invalid symbol 804 having been determined in the nominal repetition 803. The actual repetition may refer to symbols actually used for PUSCH repetition transmission among symbols configured by the configured nominal repetition, and may include a consecutive set of valid symbols that may be used for PUSCH repetition type B in one slot. Therefore, the actual repetition 805 of PUSCH repetition type B transmission may be repeatedly transmitted 18 times from the 0th symbol to the 17th transmission, and the redundancy version pattern of the repeatedly transmitted PUSCH is as described previously.

Since the actual repetition 805 of the PUSCH repetition type B transmission does not consider RF switching intervals 811, 812, 813, and 814 from UL to DL or from DL to UL of the RedCap UE, in case that the RF switching interval exists within the actual repetition 805 interval of PUSCH repetition type B transmission, a problem in which the PUSCH transmission/reception operation between the base station and the RedCap UE within the RF switching interval becomes unclear may occur.

Referring to FIG. 8B, an FDD 820 assumes a case of reporting a capability signal indicating that a RedCap UE supports half-duplex communication or a case in which although reporting of a capability signal indicating that the RedCap UE supports full-duplex communication (or does not support half-duplex communication) is performed, transmission/reception of the capability signal using half-duplex communication is configured from a base station. Further, in the FDD 820, an example in which PUSCH repetition type B transmission is performed by considering an RF switching interval from UL to DL or from DL to UL of the RedCap UE is shown in case that reception of an SSB, which is defined in the standard or configured by system information or higher layer signal, and PUSCH repetition type B transmission, the transmission of which is configured in a specific resource (frequency, time, etc.) by a higher layer signal in advance or scheduled by a DL control channel (e.g., a PDCCH) occur simultaneously in a specific time interval.

In the FDD 820, the RedCap UE may detect an SSB 821 or 822 as defined in the standard upon initial access. Thereafter, the RedCap UE may be configured to determine that the SSB 821 or 822 is received through a specific resource, such as a specific frequency (or specific RBs) and a specific time (or a specific slot or symbols), according to time and frequency resources defined in standards or configured by system information or a higher layer signal.

In addition, the RedCap UE may determine nominal repetition 823 when PUSCH repetition type B is indicated to be performed in a specific resource by a previously configured higher layer signal or by a DL control channel.

In FIG. 8B, the nominal repetition 823 is shown as an example of a case in which the start slot of the PUSCH repetition type B coincides with the transmission slot of the SSB 821, and the start symbol of the PUSCH repetition type B in a slot correspond to the 3rd symbol and has a length of 12 symbols, and the number of repetitions thereof is configured as 8.

Further, the RedCap UE may determine an invalid symbol for the PUSCH repetition type B transmission. In addition to the previously described invalid symbol determination method, the RedCap UE may determine an invalid symbol when transmission of the SSB 821 or 822 overlaps in a time resource according to time and frequency resources configured by the system information or higher layer signal. In addition, the RedCap UE may determine, as invalid symbols, symbols corresponding to intervals 832 and 834 for switching RF from DL to UL for PUSCH repetition type B transmission after the RedCap UE receives the SSB, and symbols corresponding to intervals 831 and 833 for switching RF from UL to DL for reception of the SSB after PUSCH repetition type B transmission.

As described above, the RedCap UE may skip actual repetition transmission when actual repetition having one symbol is configured as valid, except for a case in which the symbol length of the UL data channel configured is L=1. Accordingly, invalid symbols that collide with the SSB or include an RF switching interval may be shown as reference numeral 824, and a symbol, which is a valid symbol but for which actual repetition transmission is skipped because it has one symbol, may be shown as reference numeral 825.

Actual repetition 826 of PUSCH repetition type B transmission is performed in the remaining area except for the invalid symbol 824 determined in the nominal repetition 823 and the one symbol 825 for which actual repetition is skipped. The actual repetition may refer to symbols actually used for PUSCH repetition transmission among symbols configured by the configured nominal repetition, and may include a consecutive set of valid symbols that may be used for PUSCH repetition type B in one slot. Therefore, the actual repetition 826 of PUSCH repetition type B transmission may be repeatedly transmitted 7 times from the 0th symbol to the 6th transmission, and the redundancy version pattern of the repeatedly transmitted PUSCH is as described previously.

Since the actual repetition 826 of the PUSCH repetition type B transmission considers RF switching intervals 831, 832, 833, and 834 from UL to DL or from DL to UL of the RedCap UE (i.e., the switching interval right before the first symbol of each SSB and the switching interval right after the last symbol of each SSB), in case that the RF switching interval exists within the actual repetition 805 interval of PUSCH repetition type B transmission as shown in FIG. 8A, the PUSCH transmission/reception operation between the base station and the RedCap UE within the RF switching interval becomes clear.

For example, when a RedCap UE supporting half-duplex communication in paired spectrum (or FDD) is instructed by a base station to transmit PUSCH repetition type B, the UE may consider symbols of the SSB 821 or 822 indicated by system information (ssb-PositionInBurst) or a higher layer signal (ssb-PositionInBurst) as invalid symbols for PUSCH repetition type B, and the actual repetition 826 of PUSCH repetition type B transmission is performed in the remaining area 826 except for the invalid symbol 824 determined in the nominal repetition 823 and the one symbol 825 for which actual repetition is skipped.

Additionally, for consideration of the switching interval as described above, as another example, when a RedCap UE supporting half-duplex communication in paired spectrum (or FDD) is instructed by a base station to transmit PUSCH repetition type B, the UE may consider symbols corresponding to an RF switching interval (or switching gap) right before each first symbol of each SSB 821 or 822 indicated by the system information (ssb-PositionInBurst) or a higher layer signal (ssb-PositionInBurst) or partially corresponding to the RF switching interval as invalid symbols for PUSCH repetition type B, and the actual repetition 826 of PUSCH repetition type B transmission may be performed in the remaining area 826 except for the invalid symbol 824 determined in the nominal repetition 823 and the one symbol 825 that may be defined in the standard to skip actual repetition.

As another example considering the switching interval, when a RedCap UE supporting half-duplex communication in paired spectrum (or FDD) is instructed by the base station to transmit PUSCH repetition type B, the UE may consider symbols corresponding to an RF switching interval (or switching gap) right after each first symbol of each SSB 821 or 822 indicated by the system information (ssb-PositionInBurst) or a higher layer signal (ssb-PositionInBurst) or partially corresponding to the RF switching interval as invalid symbols for PUSCH repetition type B, and the actual repetition 826 of PUSCH repetition type B transmission may be performed in the remaining area 826, except for the invalid symbol 824 determined in the nominal repetition 823 and the one symbol 825 that may be defined in the standard to skip actual repetition.

Figure 9A:
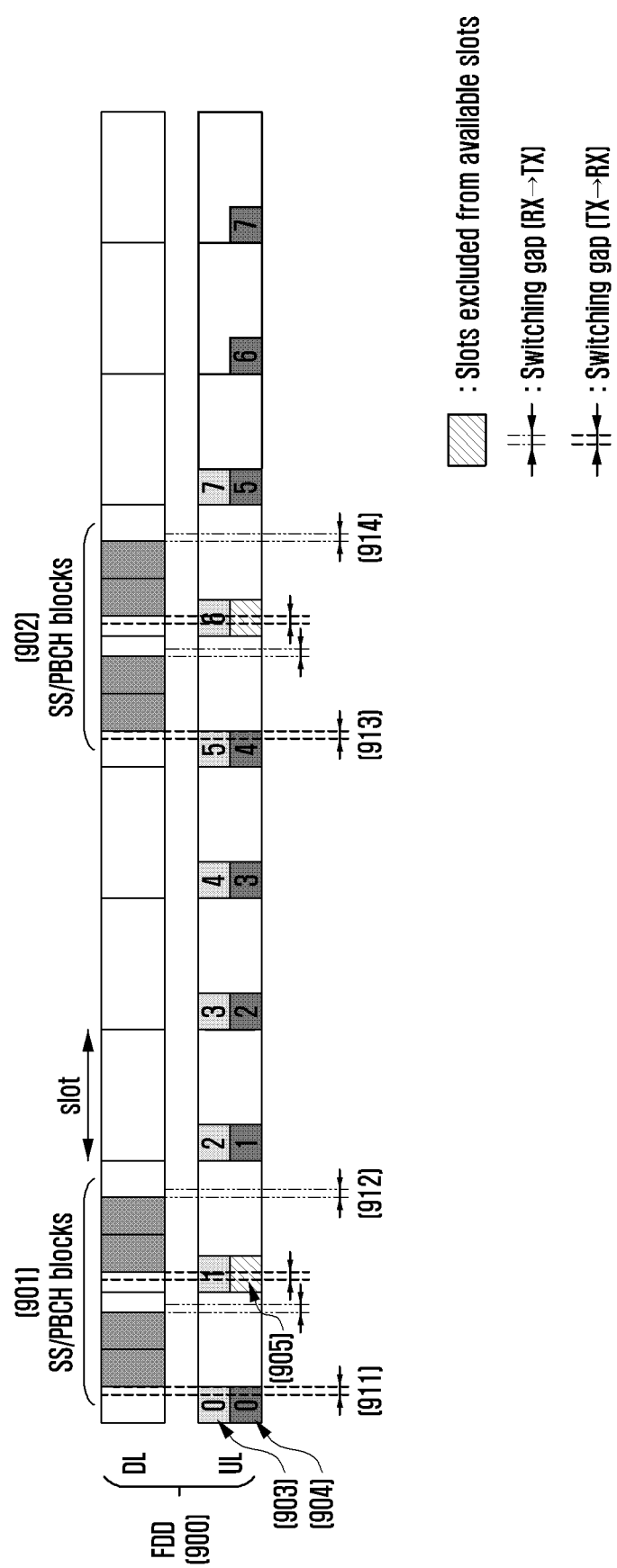
FIG. 9A illustrates SSB reception and PUSCH repetition type A transmission of a RedCap UE simultaneously occurring in a wireless communication system according to an embodiment.
Figure 9B:
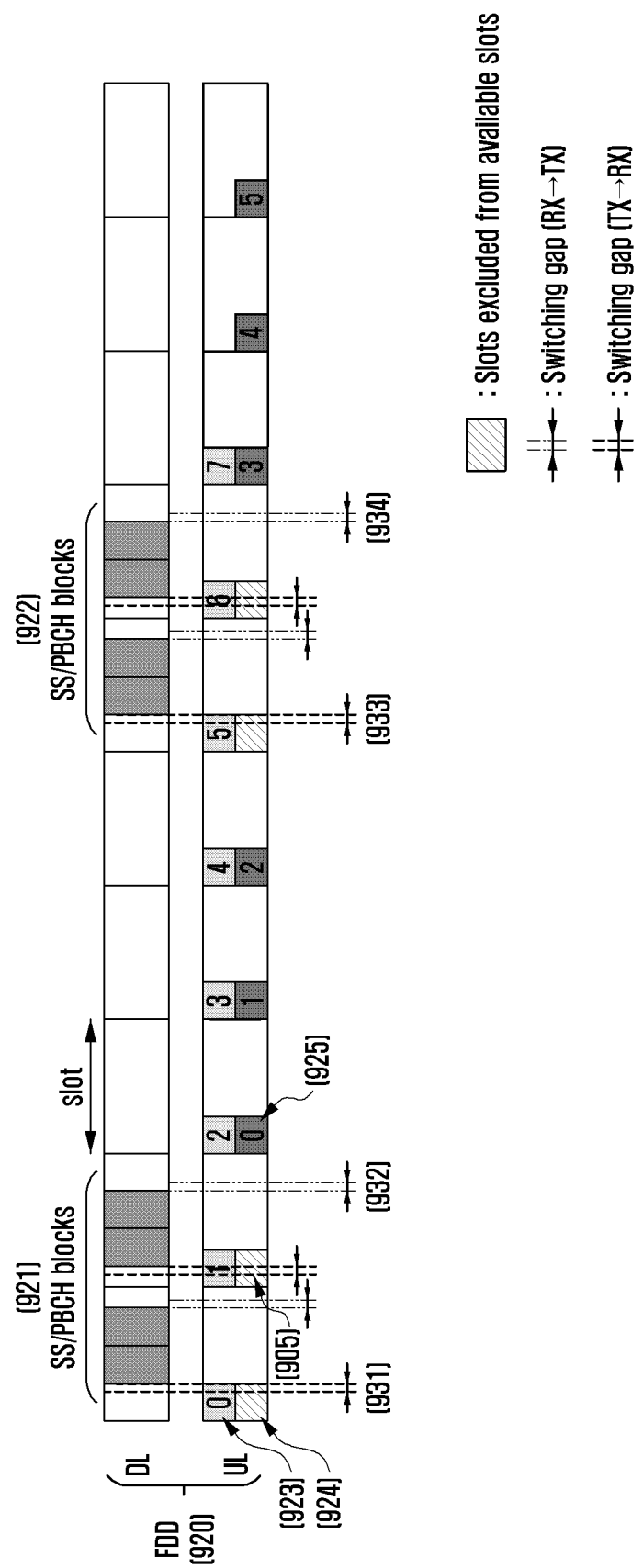
FIG. 9B illustrates SSB reception and PUSCH repetition type A transmission of a RedCap UE simultaneously occurring in a wireless communication system according to an embodiment.

FIG. 9A illustrates SSB reception and PUSCH repetition type A transmission of a RedCap UE simultaneously occurring in a wireless communication system according to an embodiment. FIG. 9B illustrates SSB reception and PUSCH repetition type A transmission of a RedCap UE simultaneously occurring in a wireless communication system according to an embodiment.

Referring to FIGS. 9A and 9B, a method for solving a case in which SSB reception and PUSCH repetition type A transmission by a RedCap UE occur at the same time and collide in the time domain, or a case in which even if the reception and transmission do not actually collide in the time domain, when PUSCH repetition type A transmission is performed within the above described RF switching gap right before or right after the SSB will be described. In FIGS. 9A and 9B, although only a situation in which the SSB and the PUSCH repetition type A collide in the time domain is considered, the disclosure may be applied to CORESET #0 configured in MIB or SIB1, instead of the SSB, as a cell-specific configured DL, and may be applied to repeated UL reference signals such as SRS, instead of the PUSCH repetition type A, as a UL channel/signal configured by a higher layer signal (e.g., an RRC dedicated configured UL).

Referring to FIG. 9A, an FDD 900 assumes a case of reporting a capability signal indicating that a RedCap UE supports half-duplex communication or a case in which although reporting of a capability signal indicating that the RedCap UE supports full-duplex communication (or does not support half-duplex communication) is performed, transmission/reception of the capability signal using half-duplex communication is configured from a base station. Further, in the FDD 900, an example in which PUSCH repetition type A transmission is performed without considering an RF switching interval from UL to DL or from DL to UL of the RedCap UE is shown, in case that reception of an SSB, which is defined in the standard or configured by system information or a higher layer signal, and PUSCH repetition type A transmission, the transmission of which is configured in a specific resource (frequency, time, etc.) by a higher layer signal in advance or scheduled by a DL control channel (e.g., a PDCCH) occur simultaneously in a specific time interval.

In the FDD 900, the RedCap UE may detect an SSB 901 or 902 as defined in the standard upon initial access. Thereafter, the RedCap UE may be configured to determine that the SSB 901 or 902 is received through a specific resource, such as a specific frequency (or specific RBs) and a specific time (or a specific slot or symbols), according to time and frequency resources defined in standards or configured by system information or a higher layer signal. In addition, the RedCap UE may be instructed by a base station to transmit PUSCH repetition type A through a specific time domain resource by a previously configured higher layer signal or by a DL control channel. The start symbol and length of a UL data channel in one slot may be determined by the resource configuration including indication of the specific time domain resource, and the number of repeated transmissions (K or N/K) may be determined. The RedCap UE may repeatedly transmit a UL data channel having the same start symbol and length as those of the configured UL data channel, in consecutive slots based on the number of repeated transmissions received from the base station.

In FIG. 9A, resource configuration (indicated by reference numeral 903) of PUSCH repetition type A is shown as an example in which the start slot of the PUSCH repetition type A coincides with the transmission slot of the SSB 901, the start symbol of PUSCH repetition type A in a slot corresponds to the 0th symbol and has a length of 4 symbols, and the number of repetitions thereof is configured as 8. In addition, the RedCap UE may determine, as available slots (or N×K slots), 8 consecutive slots from the transmission start slot for the PUSCH repetition type A transmission (indicated by reference numeral 903).

In addition to the method of determining consecutive available slots (or N×K slots) as described above, a UE supporting Rel-17 UL data repetition transmission (i.e., a UE reporting the capability of supporting Rel-17 UL data repetition transmission to a base station through a higher layer signal) may be configured not to include the slot in the available slots (or N×K slots) in case that AvailableSlot-Counting is enabled in higher layer configuration information received from the base station or the transmission of the SSB 901 or 902 overlaps in a time resource according to the time and frequency resources configured by the system information or the higher layer signal, and this is shown as reference numeral 905. PUSCH repetition type A transmission 904 is performed in the slot determined as the available slot (or N×K slot). Therefore, PUSCH repetition type A transmission 904 is repeatedly performed 8 times from the 0th symbol to the 7th transmission, and the redundancy version pattern of the repeatedly transmitted PUSCH is as described previously.

Since the PUSCH repetition type A transmission 904 does not consider RF switching intervals 911, 912, 913, and 914 from UL to DL or from DL to UL of the RedCap UE, in case that the RF switching interval exists within symbols of available slots (or N×K slots) in which PUSCH repetition type A transmission 904 occurs, a problem in which the PUSCH transmission/reception operation between the base station and the RedCap UE within the RF switching interval becomes unclear may occur.

Referring to FIG. 9B, an FDD 920 assumes a case of reporting a capability signal indicating that a RedCap UE supports half-duplex communication or a case in which although reporting of a capability signal indicating that the RedCap UE supports full-duplex communication (or does not support half-duplex communication) is performed, transmission/reception of the capability signal using half-duplex communication is configured from a base station. Further, in the FDD 920, an example in which PUSCH repetition type A transmission is performed by considering an RF switching interval from UL to DL or from DL to UL of the RedCap UE is shown in case that reception of an SSB, which is defined in the standard or configured by system information or a higher layer signal, and PUSCH repetition type A transmission, the transmission of which is configured in a specific resource (frequency, time, etc.) by a higher layer signal in advance or scheduled by a DL control channel (e.g., a PDCCH) occur simultaneously in a specific time interval.

In the FDD 920, the RedCap UE may detect an SSB 921 or 922 as defined in the standard upon initial access. Thereafter, the RedCap UE may be configured to determine that the SSB 921 or 922 is received through a specific resource, such as a specific frequency (or specific RBs) and a specific time (or a specific slot or symbols), according to time and frequency resources defined in standards or configured by system information or a higher layer signal. In addition, the RedCap UE may be instructed by a base station to transmit PUSCH repetition type A through a specific time domain resource by a previously configured higher layer signal or by a DL control channel.

In FIG. 9B, a PUSCH repetition type A resource configuration (indicated by reference numeral 923) is shown as an example in which the start slot of the PUSCH repetition type A coincides with the transmission slot of the SSB 921, the start symbol of PUSCH repetition type A in a slot corresponds to 0th symbol and has a length of 4 symbols, and the number of repetitions thereof is configured as 8. In addition, the RedCap UE may determine, as available slots (or N×K slots), 8 consecutive slots from the transmission start slot for the PUSCH repetition type A transmission (indicated by reference numeral 923).

In addition to the method of determining consecutive available slots (or N×K slots) as described above, a UE supporting Rel-17 UL data repetition transmission (i.e., a UE reporting the capability of supporting Rel-17 UL data repetition transmission to a base station through a higher layer signal) may be configured not to include the slot in the available slots (or N×K slots) in case that AvailableSlotCounting is enabled in higher layer configuration information received from the base station or the transmission of the SSB 921 or 922 overlaps in a time resource according to the time and frequency resources configured by the system information or the higher layer signal, and as shown in reference numeral 924, slots excluded from the available slots or N×K slots indicating the number of repetitive transmissions in a slot are shown. In addition, the RedCap UE may be configured not to include, in available slots (or N×K slots), symbols corresponding to intervals 932 and 934 for switching RF from DL to UL for PUSCH repetition type A transmission after receiving the SSB and intervals 931 and 933 for switching RF from UL to DL to receive the SSB after PUSCH repetition type A transmission. Therefore, a slot including a symbol that collides with an SSB or includes an RF switching interval may be shown as reference numeral 924, and after determining an available slot (or N×K slot) by excluding slots 924 from the available slot (or N×K slot), PUSCH repetition type A transmission 925 is performed in the available slot (or N×K slot). Therefore, the PUSCH repetition type A transmission 925 is repeatedly performed 8 times from the 0th symbol to the 7th transmission, and the redundancy version pattern of the repeatedly transmitted PUSCH is as described previously (in FIG. 9B, only the 5th repetition transmission is shown, but 6th and 7th repetition transmissions may exist).

Since the PUSCH repetition type A transmission 925 considers RF switching intervals 921, 922, 923, and 924 from UL to DL or from DL to UL of the RedCap UE (that is, the switching interval right before the first symbol of each SSB and the switching interval right after the last symbol of each SSB), in case that the RF switching interval exists within the available slot (or N×K slot) of the PUSCH repetition type A transmission 925, the PUSCH transmission/reception operation between the base station and the RedCap UE within the RF switching interval becomes clear by excluding slots including the RF switching interval when determining the available slots (or N×K slots).

For example, when AvailableSlotCounting is enabled for a RedCap UE supporting half-duplex communication, the UE may be configured not to include the slot in the number of available slots (or N×K slots) in case that at least one symbol among symbols of an SSB 921 or 922 having an index given by system information or a higher layer signal (ssb-PositionInBurst) and symbols in one slot given by a row indicated by a resource allocation table for PUSCH repetition type A overlap, determine the remaining non-consecutive slots as the available slot (or N×K slot), and perform the UL data channel repetition transmission in the slot determined as the available slot (or N×K slot).

Additionally, as another example considering the switching interval as described above, when AvailableSlotCounting is enabled for a RedCap UE supporting half-duplex communication, the UE may be configured not to include the slot in the number of available slots (or N×K slots) in case that at least one symbol among symbols corresponding to the RF switching interval (or switching gap) right before each first symbol of an SSB 921 or 922 having an index given by system information or a higher layer signal (ssb-PositionInBurst) or partially corresponding to the RF switching interval and symbols in one slot given by a row indicated by a resource allocation table for PUSCH repetition type A overlap, determine the remaining non-consecutive slots as the available slot (or N×K slot), and perform the UL data channel repetition transmission in the slot determined as the available slot (or N×K slot).

As yet another example considering the switching interval, when AvailableSlotCounting is enabled for a RedCap UE supporting half-duplex communication, the UE may be configured not to include the slot in the number of available slots (or N×K slots) in case that at least one symbol among symbols corresponding to the RF switching interval (or switching gap) right after each last symbol of an SSB 921 or 922 having an index given by system information or a higher layer signal (ssb-PositionInBurst) or partially corresponding to the RF switching interval and symbols in one slot given by a row indicated by a resource allocation table for PUSCH repetition type A overlap, determine the remaining non-consecutive slots as the available slot (or N×K slot), and perform the UL data channel repetition transmission in the slot determined as the available slot (or N×K slot).

Figure 10:
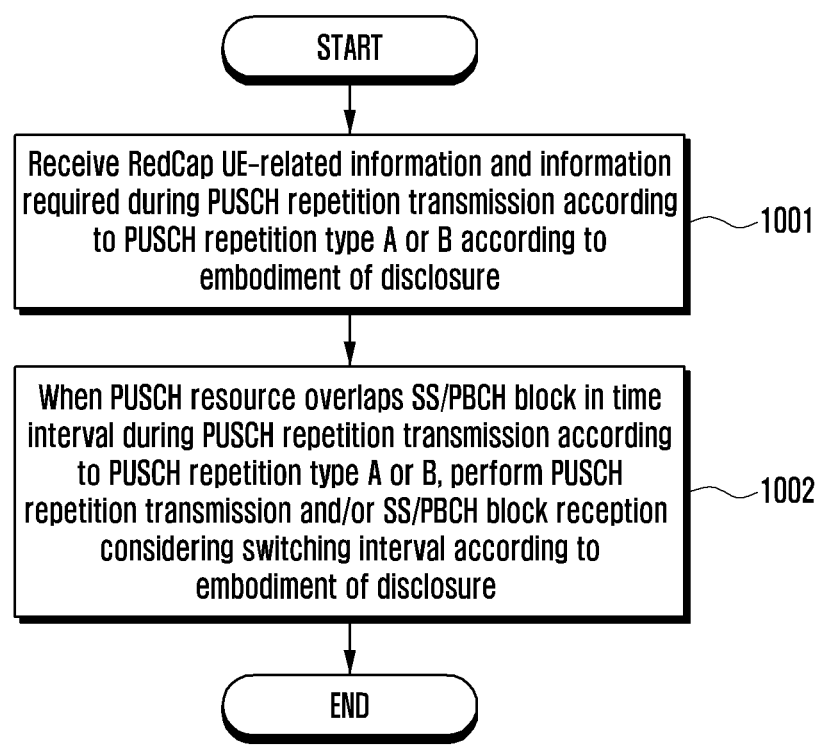
FIG. 10 is a flowchart illustrating a method performed by a RedCap UE in a wireless communication system according to an embodiment.

FIG. 10 is a flowchart illustrating a method performed by a RedCap UE in a wireless communication system according to an embodiment.

Referring to FIG. 10, in step 1001, the RedCap UE receives, from a base station, at least one of configuration information including resource information for random access in the RedCap UE, TDD or FDD cell information, valid random access occasion transmission location information, resource information about configuration-based DL signal or configuration-based UL signal, full-duplex communication or half-duplex communication configuration information, SS/PBCH block reception resource information, information required for PUSCH repetition type A transmission, and information required for PUSCH repetition type B transmission. The configuration information may be provided to the UE through SIB or RRC information or DCI. In addition, the RedCap UE transmits, to the base station, capability information of the RedCap UE including whether full-duplex communication or half-duplex communication is supported.

In step 1002, when a PUSCH resource overlaps with an SS/PBCH block in a time interval during PUSCH repetition transmission according to PUSCH repetition type A or B based on whether the cell is TDD or FDD, whether the RedCap UE supports half-duplex communication or full-duplex communication, and/or whether the base station configures half-duplex communication or full-duplex communication, the RedCap UE performs the PUSCH repetition transmission in which symbols from which the SS/PBCH block is transmitted and a switching interval for consecutively performing SS/PBCH block reception and PUSCH repetition transmission are considered. In addition, the RedCap UE may perform reception of the SS/PBCH block.

Each operation of FIG. 10 may be skipped or added, and does not need to be performed in the described order.

Figure 11:
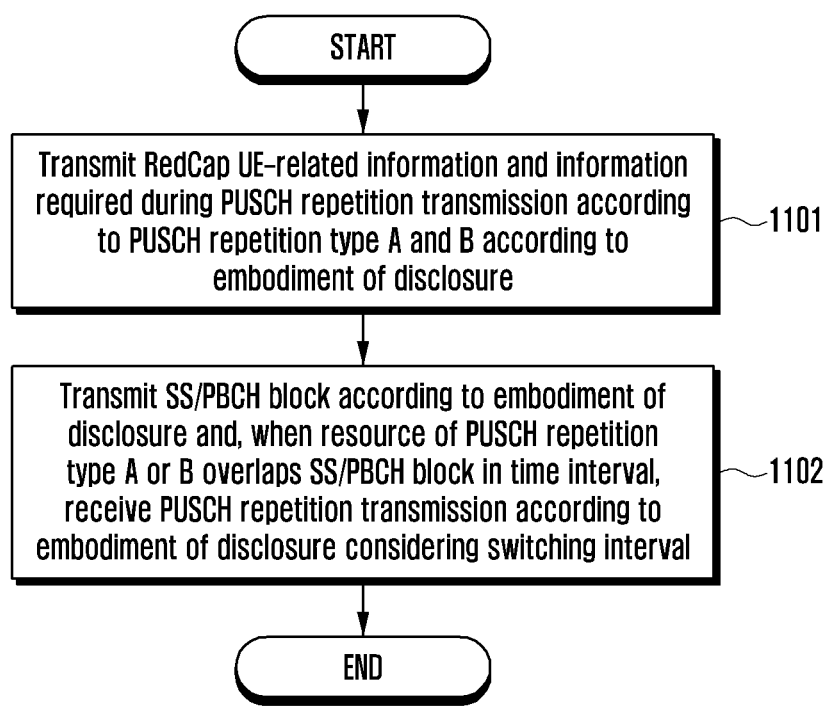
FIG. 11 is a flowchart illustrating a method performed by a base station in a wireless communication system according to an embodiment.

FIG. 11 is a flowchart illustrating a method performed by a base station in a wireless communication system according to an embodiment.

Referring to FIG. 11, in step 1101, a base station transmits, to a RedCap UE, at least one of configuration information including resource information for random access, TDD or FDD cell information, valid random access occasion transmission location information, resource information about configuration-based DL signal or configuration-based UL signal, full-duplex communication or half-duplex communication configuration information, SS/PBCH block reception resource information, information required for PUSCH repetition type A transmission, and information required for PUSCH repetition type B transmission. The configuration information may be provided to the UE through SIB, RRC information, or DCI. In addition, the base station receives, from the RedCap UE, capability information of the RedCap UE including whether full-duplex communication or half-duplex communication is supported.

In step 1102, when a PUSCH resource overlaps with an SS/PBCH block in a time interval during PUSCH repetition transmission according to PUSCH repetition type A or B, the base station may be configured to receive a UL signal according to the PUSCH repetition transmission and transmit a DL signal for the SS/PBCH block in which symbols from which the SS/PBCH block is transmitted and a switching interval for consecutively performing SS/PBCH block reception and PUSCH repetition transmission are considered.

Each operation of FIG. 11 may be skipped or added, and does not need to be performed in the described order.

Figure 12:
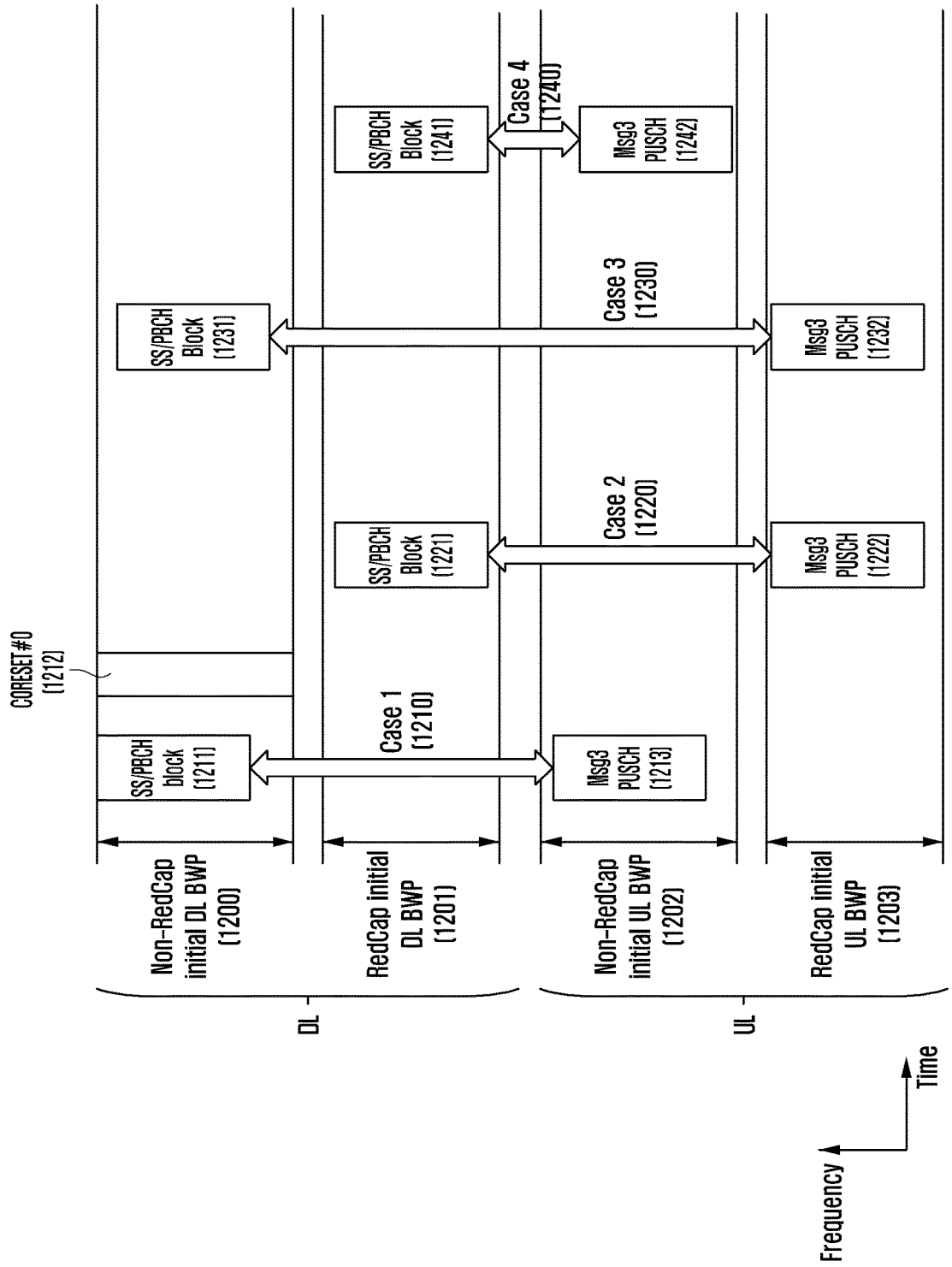
FIG. 12 illustrates downlink (DL) reception and uplink (UL) transmission by a RedCap UE simultaneously occurring in different BWP configurations in a wireless communication system according to an embodiment.

FIG. 12 illustrates DL reception and UL transmission by a RedCap UE simultaneously occurring in different BWP configurations in a wireless communication system according to an embodiment.

Referring to FIG. 12, a base station may configure one or multiple BWPs for the UE, and configure the information shown in Table 12 for each BWP in the 5G communication system.

TABLE 12

| BWP ::= | SEQUENCE { |
|---|---|
| bwp-Id (Bandwidth part Identifier) | BWP-Id, |
| locationAndBandwidth (Bandwidth part location) | INTEGER (1..65536), |
| subcarrierSpacing (subcarrier spacing) | ENUMERATED {n0, n1, n2, n3, n4, n5}, |
| cyclicPrefix (cyclic prefix) | ENUMERATED { extended } |
| } | |

In addition to the configuration information, various parameters related to the BWP may be configured for a UE. The information may be transmitted, from the base station, to the UE, through higher layer signaling, e.g., RRC signaling. At least one BWP among one or multiple BWPs may be activated. Whether or not the configured BWP is activated may be semi-statically transmitted from the base station to the UE through RRC signaling or dynamically transmitted through DCI.

The UE, before the RRC connection, may receive an initial BWP for initial access, from the base station, through an MIB or SIB 1.

the UE may receive configuration information about CORESET #0 and search space #0 through which a PDCCH for reception of system information (that may correspond to remaining system information (RMSI) or SIB 1) for initial access through the MIB in the initial access stage. The CORESET and the search space configured using the MIB may be regarded as ID 0, respectively. The base station may notify the UE of configuration information, such as frequency allocation information, time allocation information, and numerology for CORESET #0 through the MIB. In addition, the base station may notify the UE of configuration information related to a monitoring period and an occasion for CORESET #0, i.e., configuration information about search space #0, through the MIB.

In a method for configuring the initial BWP, UEs that have not yet been RRC-connected may receive configuration information about an initial BWP through an MIB in an initial access stage. More specifically, a UE may receive, from the MIB of a PBCH, a configuration of a CORESET for a DL control channel through which DCI for scheduling an SIB is able to be transmitted. The bandwidth of the CORESET configured through the MIB may be regarded as an initial BWP, and the UE may receive a PDSCH through which an SIB is transmitted through the configured initial BWP. The initial BWP may be used for other system information (OSI), paging, random access, and reception of an SIB.

A legacy Rel-16 UE or a Rel-17 RedCap UE may receive PSS, SSS, and PBCH from an SSB 1211. The legacy Rel-16 UE or RedCap UE may acquire, through pdcch-ConfigSIB1 in MIB in the PBCH, multiplexing pattern information between the SSB 1211 and CORESET #0 1212, the number of RBs in the frequency domain of CORESET #0 1212 and the number of symbols in the time domain, offset information between a frequency-domain start location of the CORESET #0 1212 and a frequency-domain start location of the SSB 1211, and the slot and symbol location in the time domain of CORESET #0.

For example, the Rel-16 UE or RedCap UE may determine one index value among the index values between 0 and 15, as shown in Table 13 below, through 4 bits of pdcch-ConfigSIB1, and may acquire part of the pieces of information corresponding to the determined index value, i.e., multiplexing pattern information between the SSB 1211 and CORESET #0 1212, the number of RBs in the frequency domain of CORESET #0 1212 and the number of symbols in the time domain, and offset information between a frequency-domain start location of the CORESET #0 1212 and a frequency-domain start location of the SSB 1211. In addition, the Rel-16 UE or RedCap UE may determine one index value among the index values between 0 and 15, as shown in Table 14 below, through another 4 bits of pdcch-ConfigSIB1, and may acquire part of the pieces of information corresponding to the determined index value, i.e., the slot and symbol location in the time domain of CORESET #0. Tables 13 and 14 below provide only parts of a table, and other tables for mapping the same information may exist.

Hereinafter, Table 13 may indicate, using a specific number of bits, multiplexing pattern information between the SSB and CORESET #0, the number of RBs in the frequency domain of CORESET #0 and the number of symbols in the time domain, and offset information between a frequency-domain start location of CORESET #0 and a frequency-domain start location of the SS. Table 14 may indicate the slots and symbol location in the time domain of CORESET #0, using a specific number of bits. Which of Table 13 and Table 14 is to be selected by the RedCap UE may be determined by an SCS of the SSB, an SCS of a control channel, a minimum channel bandwidth of a frequency band, or information of a frequency band operating based on shared spectrum channel access. Table 13 and Table 14 below may refer to TS 38.213.

TABLE 13

| Index | SS/PBCH block and CORESET multiplexing pattern | Number of RBs $N_{RB}^{CORESET}$ | Number of Symbols $N_{symb}^{CORESET}$ | Offset (RBs) |
|---|---|---|---|---|
| 0 | 1 | 24 | 2 | 0 |
| 1 | 1 | 24 | 2 | 2 |
| 2 | 1 | 24 | 2 | 4 |
| 3 | 1 | 24 | 3 | 0 |
| 4 | 1 | 24 | 3 | 2 |
| 5 | 1 | 24 | 3 | 4 |
| 6 | 1 | 48 | 1 | 12 |
| 7 | 1 | 48 | 1 | 16 |
| 8 | 1 | 48 | 2 | 12 |
| 9 | 1 | 48 | 2 | 16 |
| 10 | 1 | 48 | 3 | 12 |
| 11 | 1 | 48 | 3 | 16 |
| 12 | 1 | 96 | 1 | 38 |
| 13 | 1 | 96 | 2 | 38 |
| 14 | 1 | 96 | 3 | 38 |
| 15 | Reserved | | | |

TABLE 14

| Index | O | Number of search space sets per slot | M | First symbol index |
|---|---|---|---|---|
| 0 | 0 | 1 | 1 | 0 |
| 1 | 0 | 2 | 1/2 | {0, if i is even}, {$N_{symb}^{CORESET}$, if i is odd} |
| 2 | 2 | 1 | 1 | 0 |
| 3 | 2 | 2 | 1/2 | {0, if i is even}, {$N_{symb}^{CORESET}$, if i is odd} |
| 4 | 5 | 1 | 1 | 0 |
| 5 | 5 | 2 | 1/2 | {0, if i is even}, {$N_{symb}^{CORESET}$, if i is odd} |
| 6 | 7 | 1 | 1 | 0 |
| 7 | 7 | 2 | 1/2 | {0, if i is even}, {$N_{symb}^{CORESET}$, if i is odd} |
| 8 | 0 | 1 | 2 | 0 |
| 9 | 5 | 1 | 2 | 0 |
| 10 | 0 | 1 | 1 | 1 |
| 11 | 0 | 1 | 1 | 2 |
| 12 | 2 | 1 | 1 | 1 |
| 13 | 2 | 1 | 1 | 2 |
| 14 | 5 | 1 | 1 | 1 |
| 15 | 5 | 1 | 1 | 2 |

The legacy Rel-16 UE or RedCap UE may determine the time-frequency location of CORESET #0 1212 through acquisition of the above information.

When a configuration of the initial BWP is not provided to the legacy Rel-16 UE or RedCap UE through initialDownlinkBWP in SIB1, the initial BWP 1200 may be defined as having the same frequency resource as the frequency resource according to the frequency domain of the CORESET #0 1212, i.e., the location and number of consecutive PRBs starting from the PRB of the lowest value and ending with the PRB of the highest value of the CORESET #0 1212.

The initial BWP may be common CORESET #0 or common initial BWP applicable to all UEs in a cell, i.e., the legacy Rel-16 UEs or RedCap UEs. However, for a Rel-17 RedCap UE, in order to reduce the complexity of the UE, a complexity-reducing method is considered, such as reducing the RF bandwidth (e.g., from 100 MHz to 20 MHz for FR1, and from 200 MHz to 100 MHz for FR2) and reducing the number of reception antennas from 4 or 2 to 1, or 2 to 1. If a RedCap UE and the legacy general UE (or Rel-16 UE) coexist in one base station, a method for supporting the initial BWP and CORESET #0 may be required during initial access of the RedCap UE due to the RF bandwidth of the RedCap UE, which is different from that of the legacy general UE. In addition, since the RedCap UE may have smaller number of reception antennas than that of the legacy Rel-16 UE, DL resources having many CORESET #0 may be required to provide DL coverage similar to that of the legacy Rel-16 UE. In this case, in order to minimize the impact on DL resources for data transmission/reception to/from the legacy Rel-16 UE, and to support the initial BWP and CORESET #0 dedicated to RedCap UEs during initial access of multiple RedCap UEs, an initial BWP dedicated to RedCap UEs may be configured.

A scheme for configuring, in a RedCap UE, an initial BWP dedicated to the RedCap UE through SIB1 or a new SIB dedicated to the RedCap UE will be described below.

The size in the frequency domain of the CORESET #0 or the initial BWP dedicated to the RedCap UE may be configured up to 20 MHz in the case of FR1 (e.g., 450 MHz-7125 MHz) and up to 100 MHz in the case of FR2 (e.g., 24250 MHz-52600 MHz). The initial BWP dedicated to the RedCap UE or the frequency or time resource of the CORESET #0 may be determined independently of resource configuration of the common initial BWP or CORESET #0.

The configuration information of an initial BWP dedicated to the RedCap UE may be received by the RedCap UE through SIB1 or a new SIB dedicated to the RedCap UE.

For example, initialDownlinkBWPForRedCap, which is configuration information for the initial BWP dedicated to the RedCap UE, may be included in SIB1 as shown in Table 15.

TABLE 15

DownlinkConfigCommonSIB ::= SEQUENCE {
frequencyInfoDL      FrequencyInfoDL-SIB,
initialDownlinkBWP         BWP-DownlinkCommon,
bcch-Config       BCCH-Config,
pcch-Config       PCCH-Config,
...
initialDownlinkBWPForRedCap  BWP-DownlinkCommon,
}

As another example, initialDownlinkBWP, which is configuration information for an initial BWP dedicated to the RedCap UE, may be included in the new SIB only for the RedCap UE as shown in Table 16.

TABLE 16

SIBForRedCap ::= SEQUENCE {
initialDownlinkBWP       BWP-DownlinkCommon,
}

The configuration information initialDownlinkBWPForRedCap or initialDownlinkBWP for the initial BWP dedicated to the RedCap UE may include at least one of information indicating the frequency location and bandwidth of the initial BWP, information indicating an SCS, and information indicating a CP.

The frequency or time resource configuration of the CORESET #0 dedicated to the RedCap UE may be performed using a method in which the PDCCH-ConfigSIB1 indicates the index values in Tables 13 and 14 or a method in which the index value indicating resource configuration is indicated through PDCCH-ConfigCommon included in the SIB1 or a new SIB. In this case, the index values indicated through PDCCH-ConfigCommon included in the SIB1 or the new SIB may be obtained based on Tables 13 and 14.

Here, partial information including information on the number of RBs in the frequency domain of CORESET #0 and the number of symbols in the time domain, information on the slot and symbol location in the time domain of CORESET #0, etc., in Tables 13 and 14, may be available for the RedCap UE, and information other than the above information, i.e., at least one of the multiplexing pattern information between the SSB and CORESET #0 and the offset information between a frequency-domain start location of CORESET #0 and a frequency-domain start location of the SSB, may be ignored by the RedCap UE.

Alternatively, tables similar to Tables 13 and 14 for the CORESET #0 1212 applied to the RedCap UE can be defined. In this case, at least one piece of information among the number of RBs in the frequency domain, information on the slot and symbol location in the time domain of CORESET #0, multiplexing pattern information between the SSB and CORESET #0, and offset information of CORESET #0 may be indicated by an index value indicated by PDCCH-ConfigCommon included in SIB1 or anew SIB. In this case, the index based on the table may indicate partial information including information on the number of RBs in the frequency domain of CORESET #0 and the number of symbols in the time domain, information on the slot and symbol location in the time domain of CORESET #0, etc.

The initial BWP dedicated to the RedCap UE and the CORESET #0 as described above may also be used after initial access. That is, until random access is performed after initial cell access, the RedCap UE using only the common initial BWP or CORESET #0 is defined in the standard, and after random access, e.g., after PUCCH transmission to msg4, the RedCap UE performing data transmission and reception through a dedicated initial BWP and CORESET #0 may be defined in the standard.

Alternatively, the RedCap UE performing data transmission and reception through the initial BWP dedicated to the RedCap UE and CORESET #0 upon receiving configuration for the initial BWP dedicated to the RedCap UE and CORESET #0 may be defined in the standard. In this case, unlike the legacy UE, the RedCap UE may simultaneously activate a common initial BWP and an initial BWP dedicated to the RedCap UE, and may simultaneously receive or transmit a channel and/or signal through the common initial BWP and the initial BWP dedicated to the RedCap UE. On the other hand, the legacy UE performing random access after initial cell access and using only the common initial BWP or CORESET #0 before completing random access may be defined in the standard, and performing data transmission and reception through the common initial BWP and CORESET #0 after random access, e.g., after PUCCH transmission to msg4 may be defined in the standard.

In this case, a collision between DL reception and UL transmission as shown in case 1, case 2, case 3, and case 4 in FIG. 12 may occur in the RedCap UE. In FIG. 12, FDD assumes a case of reporting a capability signal indicating that a RedCap UE supports half-duplex communication or a case in which although reporting of a capability signal indicating that the RedCap UE supports full-duplex communication (or does not support half-duplex communication) is performed, transmission/reception of the capability signal using half-duplex communication is configured from a base station. Further, FDD of FIG. 12 illustrates a collision for each case when reception of an SSB defined in the standard or configured by system information or a higher layer signal and transmission of msg3 PUSCH in a random access procedure occur simultaneously in a specific time interval.

In FIG. 12, a collision between an SS/PBCH block and a PUSCH corresponding to msg3 (or a PUCCH as an A/N response to msg4) occurring during a random access procedure is mainly described. However, this is applicable to even a case in which general DL channel and/or signal reception and UL channel and/or signal transmission collide.

Case 1 1210 illustrates a collision between reception of an SSB 1211 in a common initial DL BWP 1200 and transmission of an msg3 PUSCH 1213 in a common initial UL BWP 1202. Case 2 1220 illustrates a collision between reception of an SSB 1221 in an initial DL BWP 1201 dedicated to the RedCap UE and transmission of an msg3 PUSCH 1222 in an initial UL BWP 1203 dedicated to the RedCap UE. Case 3 1230 illustrates a collision between reception of an SSB 1231 in the common initial DL BWP 1200 and transmission of an msg3 PUSCH 1232 in the initial UL BWP 1203 dedicated to the RedCap UE. Case 4 1240 illustrates a collision between reception of an SSB 1241 in the initial DL BWP 1201 dedicated to the RedCap UE and transmission of an msg3 PUSCH 1242 in the common initial UL BWP 1202.

Figure 13:
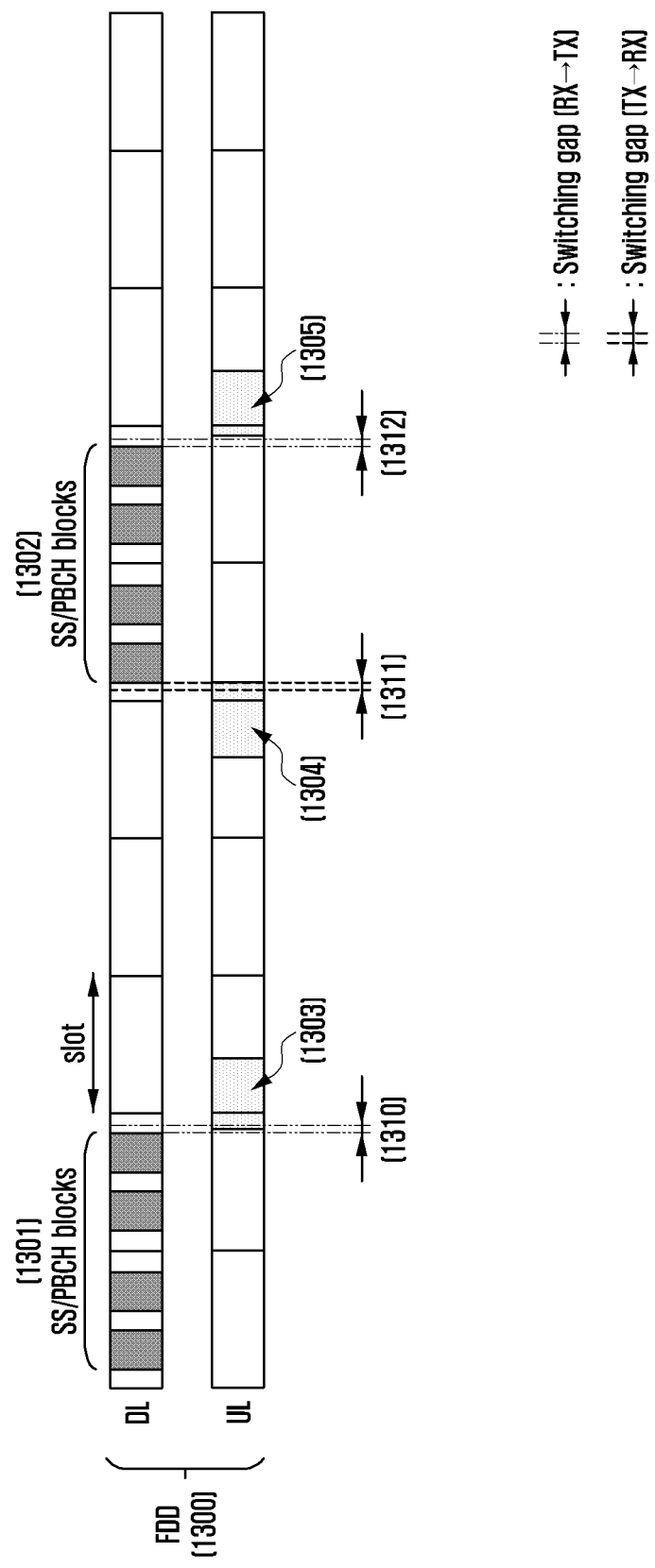
FIG. 13 illustrates DL reception and UL transmission simultaneously occurring in different BWP configurations, in consideration of a switching gap, in a wireless communication system according to an embodiment.

FIG. 13 illustrates DL reception and UL transmission simultaneously occurring in different BWP configurations, in consideration of a switching gap, in a wireless communication system according to an embodiment.

Referring to FIG. 13, a collision between an SS/PBCH block and a PUSCH corresponding to msg3 (or a PUCCH as an A/N response to msg4) occurring during a random access procedure is mainly described, but is related to general DL channel and/or signal reception. However, this is applicable to even a case in which general DL channel and/or signal reception and UL channel and/or signal transmission collide.

Consideration of the switching gap in FIG. 13 may be applied to all cases in FIG. 12, and in case that msg3 PUSCH transmission is performed in symbols right after a symbol in which each of SSBs 1301 and 1302 is received or symbols right before the symbol in which each of the SSBs 1301 and 1302 is received, switching gap intervals 1310, 1311 and 1312 between DL reception and UL transmission or between UL transmission and DL reception may be considered. For example, when there is UL transmission of msg3 PUSCH within the switching gap (indicated by reference numeral 1303 or 1304), the above case is regarded as a situation of collision between the SSB and msg3 PUSCH, and a collision situation resolving method described later may be applied thereto.

When a collision occurs for the cases to which the switching gap of FIG. 13 is applied as well as the cases of FIG. 12, the RedCap UE performs a method for resolving the collision.

As a first method, the RedCap UE may be configured not to expect that a collision between reception of the SSB 1231 in the common initial DL BWP 1200 and transmission of the msg3 PUSCH 1232 in the initial UL BWP 1203 dedicated to the RedCap UE is likely to occur, or may be configured to expect that the collision is not likely to occur. Alternatively, the RedCap UE may be configured not to expect that a collision between reception of the SSB 1241 in the initial DL BWP 1201 dedicated to the RedCap UE and transmission of the msg3 PUSCH 1242 in the common initial UL BWP 1202 is likely to occur, or may be configured to expect that the collision is not likely to occur. If the collision occurs, the collision may be resolved by the UE implementation. For example, when the collision occurs, the RedCap UE may be implemented to receive the SSB, transmit the msg3 PUSCH, or select and perform one of the SSB reception and the msg3 PUSCH transmission.

As a second method, the RedCap UE may define a UE operation with respect to a case in which reception of the SSB and transmission of the msg3 PUSCH collide in a time resource, without distinguishing between whether the initial DL BWP or the initial UP BWP is common to the UE or dedicated to the RedCap UE. That is, the same UE operation may be defined for case 1, case 2, case 3, and case 4 of FIG. 12.

For example, in the collision, the RedCap UE may prioritize reception of the SSB. That is, the RedCap UE may not perform transmission of the msg3 PUSCH. Alternatively, in the collision, the RedCap UE may prioritize transmission of msg3 PUSCH. That is, reception of the SSB may not be performed.

As a third method, the RedCap UE may apply a different operation to the collision depending on which operation is to be performed in the initial DL BWP dedicated to the RedCap UE. For example, although the RedCap UE is configured to perform random access in the initial DL BWP dedicated to the RedCap UE and not to perform paging in an idle and/or inactive mode, the RedCap UE should receive an SSB in the initial bandwidth common to the UE. Therefore, in case of a collision between reception of the SSB 1231 in the common initial DL BWP 1200 and transmission of the msg3 PUSCH 1232 in the initial UL BWP 1203 dedicated to the RedCap UE, the RedCap UE may prioritize the reception of the SSB. That is, the RedCap UE may be configured not to perform transmission of the msg3 PUSCH.

In addition, in case that the RedCap UE is configured to perform paging for an idle and/or inactive mode in the initial DL BWP dedicated to the RedCap UE, the RedCap UE should receive the SSB in the initial BWP dedicated to the RedCap UE. Therefore, the RedCap UE may be configured not to expect that a collision between reception of the SSB 1231 in the common initial DL BWP 1200 and transmission of the msg3 PUSCH 1232 in the initial UL BWP 1203 dedicated to the RedCap UE is likely to occur, or may be configured to expect that the collision is not likely to occur. If the collision occurs, the collision may be resolved by the UE implementation. For example, when the collision occurs, the RedCap UE may be implemented to receive the SSB, transmit the msg3 PUSCH, or select and perform one of the SSB reception and the msg3 PUSCH transmission.

Figure 14:
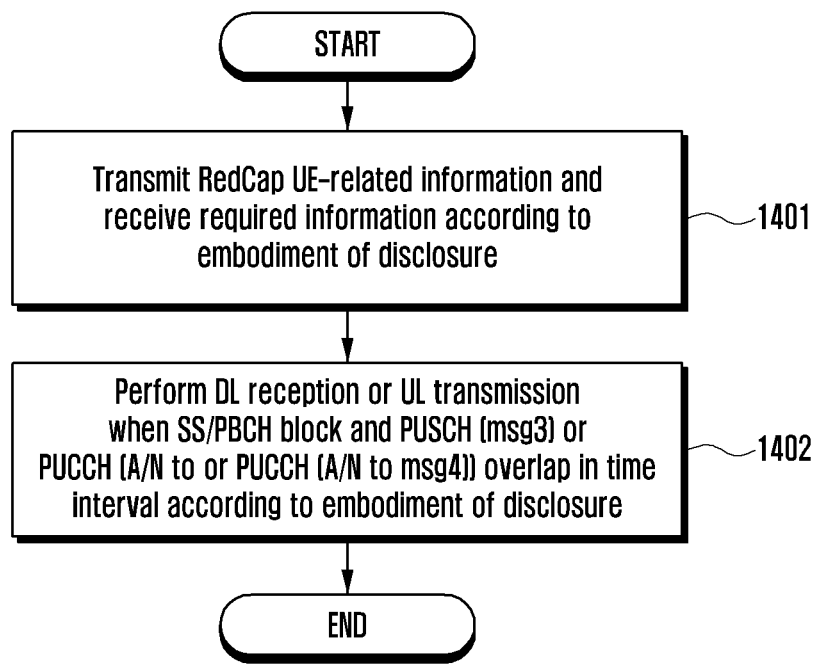
FIG. 14 is a flowchart illustrating a method performed by a RedCap UE in a wireless communication system according to an embodiment.

FIG. 14 is a flow chart illustrating a method performed by a RedCap UE in a wireless communication system according to an embodiment.

Referring to FIG. 14, in step 1401, the RedCap UE receives, from a base station, at least one of configuration information including resource information for random access in the RedCap UE, TDD or FDD cell information, valid random access occasion transmission location information, resource information about configuration-based DL signal or configuration-based UL signal, full-duplex communication or half-duplex communication configuration information, SS/PBCH block reception resource information, bandwidth information for the RedCap UE, or CORESET #0 information for the RedCap UE. The configuration information may be provided to the UE through SIB or RRC information or DCI. In addition, the RedCap UE may transmit, to the base station, capability information of the RedCap UE including whether full-duplex communication or half-duplex communication is supported.

In step 1402, when the SS/PBCH block reception and the msg3 PUSCH transmission (or PUCCH transmission including an A/N to msg4), generated in a BWP dedicated to the RedCap UE or a BWP common to the UE, overlap in a time interval, based on whether the cell is TDD or FDD, whether the RedCap UE supports half-duplex communication or full-duplex communication, and/or whether the base station configures half-duplex communication or full-duplex communication, the RedCap UE may receive the SS/PBCH block, perform the msg 3 PUSCH transmission (or PUCCH transmission including A/N to msg 4), or may not expect the collision situation to occur. When the collision is not expected, the RedCap UE may receive the SS/PBCH block or perform msg 3 PUSCH transmission (or msg 4 PUCCH transmission).

Figure 15:
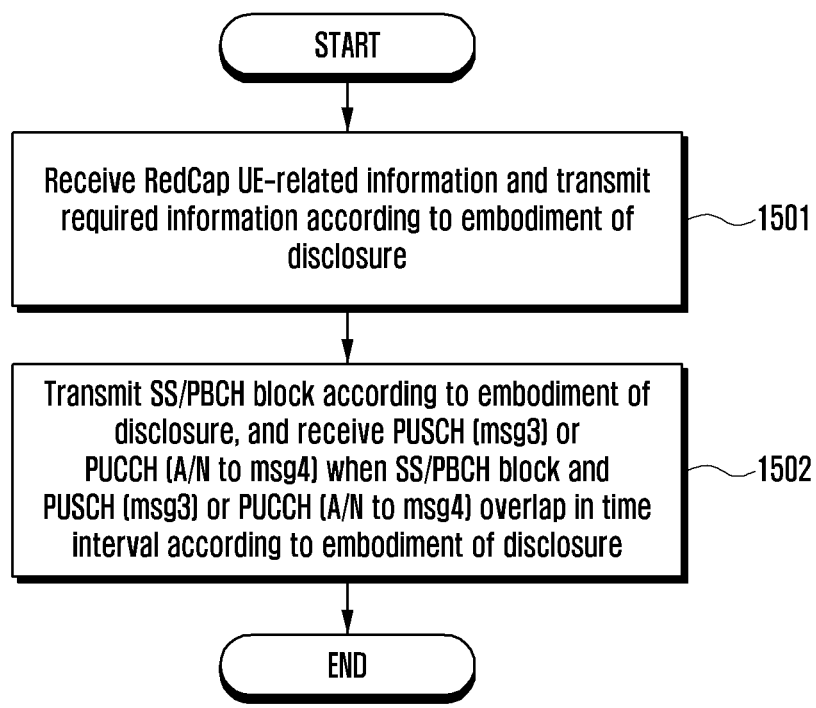
FIG. 15 is a flowchart illustrating a method performed by a base station in a wireless communication system according to an embodiment.

FIG. 15 is a flow chart illustrating a method performed by a base station in a wireless communication system according to an embodiment.

Referring to FIG. 15, in step 1501, a base station transmits, to a RedCap UE, at least one of configuration information including resource information for random access, TDD or FDD cell information, valid random access occasion transmission location information, resource information about configuration-based DL signal or configuration-based UL signal, full-duplex communication or half-duplex communication configuration information, SS/PBCH block reception resource information, bandwidth information for the RedCap UE, or CORESET #0 information for the RedCap UE. The configuration information may be provided to the UE through SIB, RRC information, or DCI. In addition, the base station may receive, from the RedCap UE, capability information of the RedCap UE including whether full-duplex communication or half-duplex communication is supported.

In step 1502, the base station transmits the SS/PBCH block and receives the msg3 PUSCH (or receives a PUCCH including an A/N to msg4) in a BWP dedicated to the RedCap UE or a BWP common to the UE. Particularly, when the SS/PBCH block reception and the msg3 PUSCH (or a PUCCH to msg4) transmission overlap in the time interval, the RedCap UE may receive the msg3 PUSCH (or a PUCCH to msg4) in which symbols from which the SS/PBCH block is transmitted or the switching interval during which the SS/PBCH block transmission and the msg 3 PUSCH (or PUCCH to msg 4) reception are consecutively performed is considered.

Figure 16:
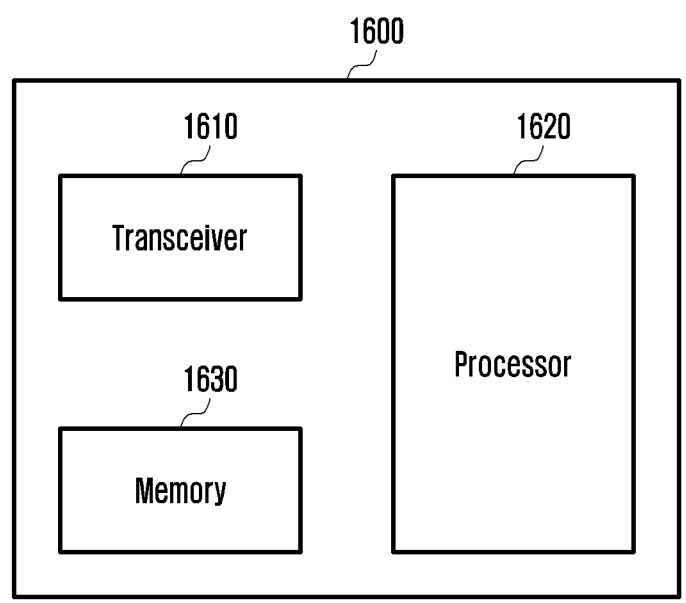
FIG. 16 illustrates a UE according to an embodiment.

FIG. 16 illustrates a UE according to an embodiment.

Referring to FIG. 16, a UE 1600 includes a transceiver 1610, a processor 1620, and a memory 1630. The UE 1600 may operate according to the methods described in FIGS. 8 to 15 in a wireless communication system to which the disclosure is applied, as described above with reference to FIGS. 1 to 7. However, elements of the UE 1600 are not limited to the above-described example. According to another embodiment, the UE 1600 may include more elements than the aforementioned elements, or a RedCap UE may include fewer elements than thereof. In addition, the transceiver 1610, the processor 1620, and the memory 1630 may be implemented in the form of a single chip.

The transceiver 1610 may include a transmitter and a receiver. The transceiver 1610 may transmit or receive a signal to or from a base station. The signal may include control information and data. To this end, the transceiver 1610 may include an RF transmitter configured to up-convert and amplify the frequency of a transmitted signal, and an RF receiver configured to low-noise amplify a received signal and down-convert the frequency of the received signal. The transceiver 1610 may receive a signal through a wireless channel, output the received signal to the processor 1620, and may transmit a signal output from the processor 1620 through a wireless channel.

The processor 1620 may be configured to control a series of processes in which the UE 1600 may operate according to the above-described embodiment of the disclosure.

The memory 1630 may store control information or data such as transmission resource configuration included in a signal obtained from the UE 1600, and may include a region for storing data required for control of the processor 1620 and data generated upon control by the processor 1620.

Figure 17:
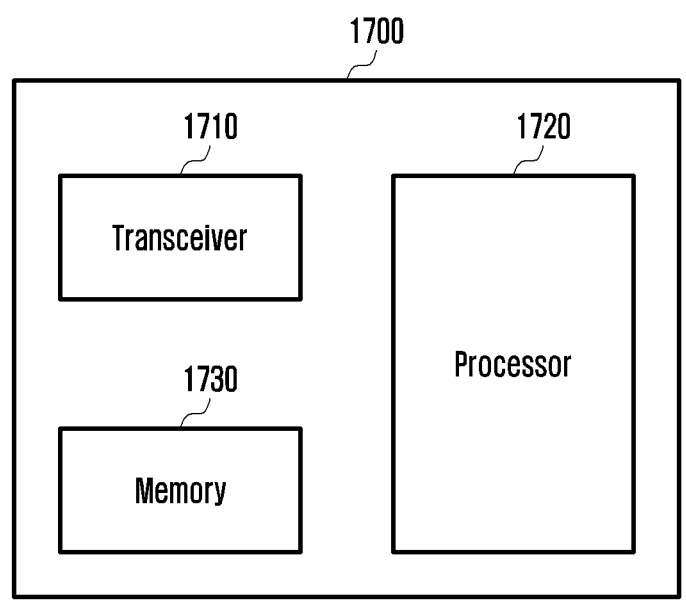
FIG. 17 illustrates a base station according to an embodiment.

FIG. 17 illustrates a base station according to an embodiment.

Referring to FIG. 17, a base station 1700 includes a transceiver 1710, a processor 1720, and a memory 1730. The base station 1700 may operate according to the methods described in FIGS. 8 to 15 in a wireless communication system to which the disclosure is applied, as described in FIGS. 1 to 7. However, elements of the base station 1700 are not limited to the above-described example. According to another embodiment, the base station 1700 may include more or fewer elements than the aforementioned elements. In addition, the transceiver 1710, the processor 1720, and the memory 1730 may be implemented in the form of a single chip.

The transceiver 1710 may include a transmitter and a receiver. The transceiver 1710 may transmit or receive a signal to or from a UE. The signal may include control information and data. To this end, the transceiver 1710 may include an RF transmitter configured to up-convert and amplify the frequency of a transmitted signal, and an RF receiver configured to low-noise amplify a received signal and down-convert the frequency of the received signal. In addition, the transceiver 1710 may receive a signal through a wireless channel, output the received signal to the processor 1720, and may transmit a signal output from the processor 1720 through a wireless channel.

The processor 1720 may control a series of processes so that the base station 1700 is able to operate according to the above-described embodiments of the disclosure. The memory 1730 may store control information and data such as transmission resource configuration determined by the base station 1700 or control information and data received from the UE, and may include a region for storing data required for control of the processor 1720 and data generated upon control by the processor 1720.

The various embodiments of the disclosure described above and shown in the drawings are merely examples that have been presented to explain technical contents of the disclosure and help understanding of the disclosure, and are not intended to limit the scope of the disclosure. That is, it will be apparent to those skilled in the art that other variants based on the technical idea of the disclosure may be implemented. Further, the above respective embodiments may be employed in combination, as necessary.

While the disclosure has been described with reference to various embodiments, various changes may be made without departing from the spirit and the scope of the present disclosure, which is defined, not by the detailed description and embodiments, but by the appended claims and their equivalents.

What is claimed is:

1. A method performed by a terminal in a communication system, the method comprising:
   receiving, from a base station, information indicating positions of synchronization signal/physical broadcast channel (SS/PBCH) blocks;
   identifying the positions of the SS/PBCH blocks based on the information;
   receiving, from the base station, configuration information on a physical uplink shared channel (PUSCH) repetition;
   identifying available resources for the PUSCH repetition by determining resources overlapped with the positions of the SS/PBCH blocks and switching intervals for the SS/PBCH blocks as unavailable resources for the PUSCH repetition; and
   repeatedly transmitting, to the base station, uplink data on a PUSCH based on the available resources.

2. The method of claim 1, wherein the PUSCH repetition corresponds to type A, and
   wherein identifying the available resources further comprises identifying a slot, in which a time domain resource of the PUSCH repetition and the positions of the SS/PBCH blocks and switching intervals adjacent to a start symbol and a last symbol of each SS/PBCH block of the SS/PBCH blocks overlap, as an unavailable slot for the PUSCH repetition.

3. The method of claim 2, wherein the unavailable slot is not counted in a number of slots for the PUSCH repetition.

4. The method of claim 1, wherein the PUSCH repetition corresponds to type B, and
   wherein identifying the available resources further comprises identifying one or more one symbols, overlapped with the positions of the SS/PBCH blocks and switching intervals adjacent to a start symbol and a last symbol of each SS/PBCH block of the SS/PBCH blocks, as one or more invalid symbols for an actual repetition.

5. The method of claim 4, wherein the actual repetition in 1 valid symbol, excluding the invalid symbols, is omitted.

6. A method performed by a base station in a communication system, the method comprising:
   transmitting, to a terminal, information indicating positions of synchronization signal/physical broadcast channel (SS/PBCH) blocks;
   transmitting, to the terminal, configuration information on a physical uplink shared channel (PUSCH) repetition; and
   repeatedly receiving, from the terminal, uplink data on a PUSCH based on available resources,
   wherein the available resources for the PUSCH repetition are based on a determination of resources overlapping with the positions of the SS/PBCH blocks and switching intervals for the SS/PBCH blocks as unavailable resources for the PUSCH repetition.

7. The method of claim 6, wherein the PUSCH repetition corresponds to type A, and
   wherein a slot, in which a time domain resource of the PUSCH repetition and the positions of the SS/PBCH blocks and switching intervals adjacent to a start symbol and a last symbol of each SS/PBCH block of the SS/PBCH blocks overlap, is determined as an unavailable slot for the PUSCH repetition.

8. The method of claim 7, wherein the unavailable slot is not counted in a number of slots for the PUSCH repetition.

9. The method of claim 6, wherein the PUSCH repetition corresponds to type B, and
   wherein one or more one symbols, overlapped with the positions of the SS/PBCH blocks and switching intervals adjacent to a start symbol and a last symbol of each SS/PBCH block of the one or more SS/PBCH blocks, are determined as one or more invalid symbols for an actual repetition.

10. The method of claim 9, wherein the actual repetition in 1 valid symbol, excluding the invalid symbols, is omitted.

11. A terminal in a communication system, the terminal comprising:
a transceiver; and
a controller coupled with the transceiver and configured to:
receive, from a base station, information indicating positions of synchronization signal/physical broadcast channel (SS/PBCH) blocks,
identify the positions of the SS/PBCH blocks based on the information,
receive, from the base station, configuration information on a physical uplink shared channel (PUSCH) repetition,
identify available resources for the PUSCH repetition by determining resources overlapped with the positions of the SS/PBCH blocks and switching intervals for the SS/PBCH blocks as unavailable resources for the PUSCH repetition, and
repeatedly transmit, to the base station, uplink data on a PUSCH based on the available resources.

12. The terminal of claim 11, wherein the PUSCH repetition corresponds to type A, and
wherein the controller is further configured to identify a slot, in which a time domain resource of the PUSCH repetition and the positions of the SS/PBCH blocks and switching intervals adjacent to a start symbol and a last symbol of each SS/PBCH block of the one or more SS/PBCH blocks overlap, as an unavailable slot for the PUSCH repetition.

13. The terminal of claim 12, wherein the unavailable slot is not counted in a number of slots for the PUSCH repetition.

14. The terminal of claim 11, wherein the PUSCH repetition corresponds to type B, and
wherein the controller is further configured to identify one or more one symbols, overlapped with the positions of the SS/PBCH blocks and switching intervals adjacent to a start symbol and a last symbol of each SS/PBCH block of the SS/PBCH blocks, as one or more invalid symbols for an actual repetition.

15. The terminal of claim 14, wherein the actual repetition in 1 valid symbol, excluding the invalid symbols, is omitted.

16. A base station in a communication system, the base station comprising:
a transceiver; and
a controller coupled with the transceiver and configured to:
transmit, to a terminal, information indicating positions of synchronization signal/physical broadcast channel (SS/PBCH) blocks,
transmit, to the terminal, configuration information on a physical uplink shared channel (PUSCH) repetition, and
repeatedly receive, from the terminal, uplink data on a PUSCH based on available resources,
wherein the available resources for the PUSCH repetition are based on a determination of resources overlapped with the positions of the SS/PBCH blocks and switching intervals for the SS/PBCH blocks as unavailable resources for the PUSCH repetition.

17. The base station of claim 16, wherein the PUSCH repetition corresponds to type A, and
wherein a slot, in which a time domain resource of the PUSCH repetition and the positions of the SS/PBCH blocks and switching intervals adjacent to a start symbol and a last symbol of each SS/PBCH block of the SS/PBCH blocks overlap, is determined as an unavailable slot for the PUSCH repetition.

18. The base station of claim 17, wherein the unavailable slot is not counted in a number of slots for the PUSCH repetition.

19. The base station of claim 16, wherein the PUSCH repetition corresponds to type B, and
wherein one or more one symbols, overlapped with the positions of the SS/PBCH blocks and switching intervals adjacent to a start symbol and a last symbol of each SS/PBCH block of the SS/PBCH blocks, are determined as one or more invalid symbols for an actual repetition.

20. The base station of claim 19, wherein the actual repetition in 1 valid symbol, excluding the invalid symbols, is omitted.

* * * * *